United States Patent [19]

Wang et al.

[11] Patent Number: 5,337,361
[45] Date of Patent: * Aug. 9, 1994

[54] RECORD WITH ENCODED DATA

[75] Inventors: Ynjiun P. Wang, Stony Brook; Jerome Swartz, Old Field; Daniel R. McGlynn, Brooklyn, all of N.Y.

[73] Assignee: Symbol Technologies, Inc., Bohemia, N.Y.

[*] Notice: The portion of the term of this patent subsequent to May 12, 2009 has been disclaimed.

[21] Appl. No.: 891,742

[22] Filed: Jun. 1, 1992

Related U.S. Application Data

[63] Continuation-in-part of Ser. No. 653,822, Feb. 11, 1991, Pat. No. 5,113,445, which is a continuation of Ser. No. 550,023, Jul. 9, 1990, abandoned, which is a continuation-in-part of Ser. No. 461,881, Jan. 5, 1990, which is a continuation-in-part of Ser. No. 851,493, Mar. 16, 1992.

[51] Int. Cl.$^5$ ............................................. H04L 9/00
[52] U.S. Cl. ........................................ 380/51; 380/23; 380/55; 380/3; 380/59; 235/462
[58] Field of Search ............... 380/51, 55, 3, 59, 23, 380/51; 235/462

[56] References Cited

U.S. PATENT DOCUMENTS

| | | | |
|---|---|---|---|
| 3,636,317 | 1/1972 | Torrey | 235/61 |
| 3,647,275 | 3/1972 | Ward | 350/3.5 |
| 3,676,644 | 7/1972 | Vaccaro et al. | 235/61 |
| 3,761,683 | 9/1973 | Rogers | 235/61 |
| 3,812,328 | 5/1974 | Tramposch | 235/61 |
| 4,141,078 | 2/1979 | Bridges, Jr. et al. | 364/900 |
| 4,318,090 | 3/1982 | Narlow et al. | 340/572 |
| 4,568,936 | 2/1986 | Goldman | 380/23 |
| 4,583,083 | 4/1986 | Bogasky | 340/572 |
| 4,654,718 | 3/1987 | Sueyoshi | 358/257 |
| 4,654,793 | 3/1987 | Elrod | 364/401 |
| 4,660,221 | 4/1987 | Dlugos | 380/23 |
| 4,689,477 | 8/1987 | Goldman | 380/23 |
| 4,794,239 | 12/1988 | Allais | 235/462 |
| 4,821,186 | 4/1989 | Munakata et al. | 364/405 |
| 4,835,713 | 5/1989 | Pastor | 364/519 |
| 4,863,196 | 9/1989 | Ohnishi et al. | 283/82 |
| 4,868,375 | 9/1989 | Blanford | 235/462 |
| 4,893,333 | 1/1990 | Baran et al. | 379/100 |
| 4,908,873 | 3/1990 | Philibert et al. | 382/34 |
| 4,934,846 | 6/1990 | Gilham | 380/23 |
| 4,939,354 | 7/1990 | Priddy et al. | 235/456 |
| 4,949,381 | 8/1990 | Pastor | 380/51 |
| 4,972,476 | 11/1990 | Nathans | 380/23 |
| 4,973,829 | 11/1990 | Ishida et al. | 235/462 |
| 4,975,948 | 12/1990 | Andresen et al. | 379/355 |

FOREIGN PATENT DOCUMENTS

| | | |
|---|---|---|
| 0130953 | 1/1985 | European Pat. Off. . |
| 0405099A2 | 1/1991 | European Pat. Off. . |
| 59-44157 | 3/1984 | Japan . |
| 62-91075 | 5/1987 | Japan . |

OTHER PUBLICATIONS

Wang et al., "Postal Applications of a High Density Bar Code" (Sep. 1990).
Wang, "PDF417 Specification" (1991).

*Primary Examiner*—David C. Cain
*Attorney, Agent, or Firm*—Finnegan, Henderson, Farabow, Garrett & Dunner

[57] ABSTRACT

A record contains a graphic image and an information area which are interrelated to discourage misuse of the record. The information area can overlay the graphic image and include information encoded in a error-correctable, machine-readable format which allows recovery of the information despite distortion due to the underlying graphic image. The record may also represent the image by words similar in form to words in the information area. Both the information and graphic words can then be altered when an action regarding the record takes place.

28 Claims, 16 Drawing Sheets

| PDF417 SECURITY LEVEL | |
|---|---|
| SECURITY LEVEL | ERROR CORRECTION CODEWORDS |
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M |  | L |  | M | H | H |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M |  | L |  | M | H | H |
| ROW | 2 | 2 | 2 | 2 |  | 1 |  | 1 | 1 | 1 |

RECORD WITH ENCODED DATA

This application is a continuation-in-part of application Ser. No. 07/653,822, filed Feb. 11, 1991, now U.S. Pat. No. 5,113,445 which is a continuation application of application Ser. No. 07/550,023, filed Jul. 9, 1990, abandoned. This application is also a continuation-in-part of application Ser. No. 07/461,881, filed Jan. 5, 1990 and a continuation-in-part of application Ser. No. 07/851,493 filed Mar. 16, 1992.

BACKGROUND OF THE INVENTION

The present invention relates generally to records which contain both machine-readable representations of data and images, and more particularly to records, such as driver's licenses, visas, tickets, or bearer bonds, in which the image, such as a photograph, is overlaid or represented in a manner similar to data relating to the image or to the record.

Currently, many records include both images, such as photographs, and data, such as text. Passports, visas, and drivers licenses include photographs of their owners and data about the use of the records. A passport has information recording the status of the traveler. A visa has information regarding the purpose of the visit of the holder. A driver's license has information regarding the owner's driving restrictions.

Other records have images, such as pictures, and different types of data. For example, certain bonds will have a distinctive picture, such as of George Washington, as well as data about the bonds. Other records, such as stock certificates and the like, have similar types of images and data.

Currently, the data and images on such records are separate. There has been no mechanism to interrelate the data and images in a way that enhances the properties of the record. Such enhancement could be used to reduce counterfeiting, which is a problem both for records using a photograph for identification and for records using a distinctive picture.

In combining the images and the data, it would also be advantageous to encode the data to make it difficult to understand the information without the appropriate decoding machinery. This would further discourage counterfeiting.

There are also good reasons to encode the data into a format which allows a great deal of information to be placed on the record. For example, for those records which use photographs for identification, the information on the record could include further identifying information about the owner of the record, such as eye color, hair color, height, weight, etc. Then, if a new photograph were inserted over the appropriate photograph, the information would not match the new photograph and the counterfeiting would be detected.

Another way to make counterfeiting more difficult is to place the encoded information over the picture. If this were done, any replacement or alteration of the picture would also remove or distort some of the verifying information as well.

There are problems in doing this, however. The overlaid information may distort or obscure the photograph, thereby making it difficult to use the photograph for identification. In addition, the light and dark areas of the photograph may distort the information, making it difficult to read the information.

For records that have pictorial images, the problem is less one of identification than it is of preventing multiple redemption. In such cases, counterfeiting could be detected if the data on the record included information regarding the status of the record so that multiple redemptions could be detected. To make multiple redemptions all the more difficult, it would be advantageous to encode the information and to use the picture as a back-up security measure. Presently, this is not done.

SUMMARY OF THE INVENTION

It is therefore an object of this invention to provide a record with a graphic image along with encoded information to validate or authenticate the record.

It is another object of the invention to provide such information without substantially distorting the graphic image.

It is a further object of this invention to provide a record with graphic and encoded information such that any distortion in the information placed on the record can be easily detected.

Another object of the invention is to provide a graphic image encoded information on a record in such a way as to incorporate encoded information in the image.

Additional objects and advantages of this invention will be set forth in part in the description which follows and in part will be obvious from that description, or may be learned by practice of this invention. The advantages of this invention may be realized and attained by means of the instrumentalities and combinations particularly pointed in the appended claims.

To achieve the objects and in accordance with the purpose of the invention, as embodied and broadly described herein, a record according to this invention contains an image portion containing a graphic image and an information portion including data encoded in an machine-readable format. The format includes at least two adjacent rows of codewords, each codeword representing at least one pattern of arks.

More specifically, the information portion of the record may overlay the graphic image without obscuring it and the machine-readable format can be error-correctable and capable of allowing recovery of the information despite distortion due to the graphic image.

Alternatively, the codewords may include a plurality of information words in the information portion, and a plurality of image words in the image portion, with each codeword containing a pattern of marks, and the patterns of marks of all of the image words representing the graphic image.

The accompanying drawings, which are incorporated in and constitute a part of the specification, illustrate embodiments of the invention and, together with the general description, serve to explain the principles of the invention.

DESCRIPTION OF THE PREFERRED EMBODIMENTS

Reference will now be made in detail to presently preferred embodiments of the invention, examples of which are illustrated in the accompanying drawings.

Figure 1A:
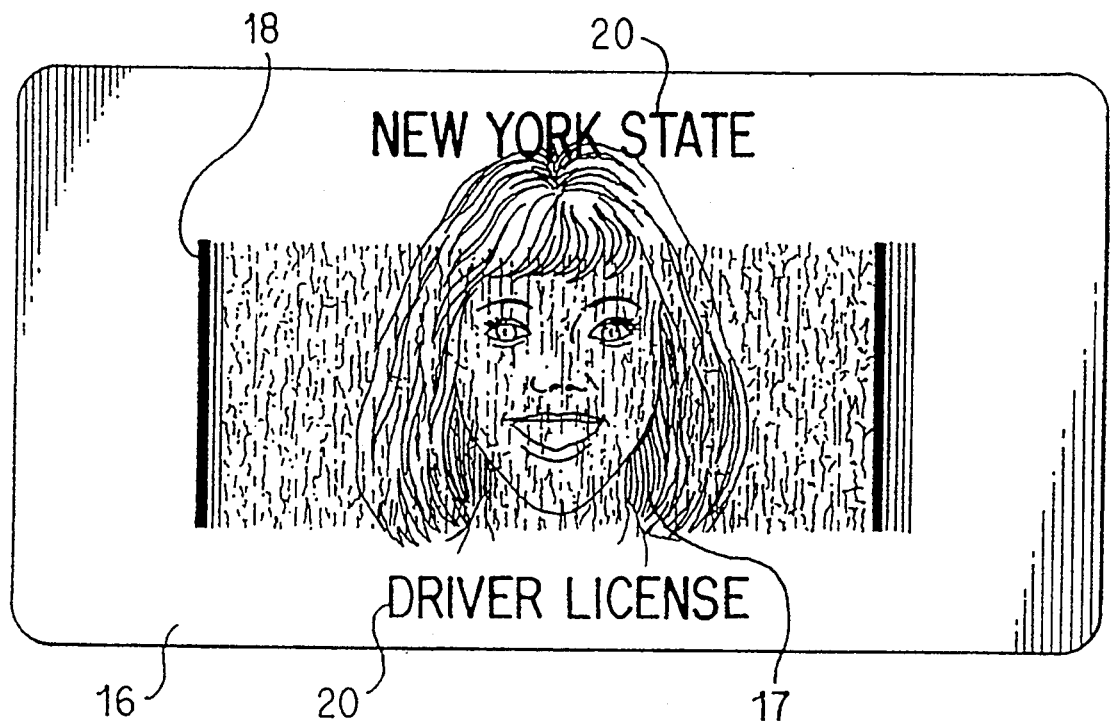
FIG. 1A is a diagram of a driver's license with a two dimensional bar code overlaying a photograph.

FIG. 1A shows an embodiment of this invention in which encoded information is overlaid on a graphic image. FIG. 1A includes a diagram of a record 16 which is shown as a driver's license but could as well be a passport, visa, or any other record with an area that contains an image. Record 16 includes a graphic image 17 which, if record 16 were a driver's license, would be a photograph of the owner of the license.

Overlaid on top of image 17 is a two-dimensional pattern 18 containing encoded information. Preferably the information in pattern 18 is encoded in the PDF417 two-dimensional bar code described in detail below. One advantage of the PDF417 code is that it is error-correctable which allows recovery of information that may be distorted due to the photograph or other image.

Pattern 18 is preferably printed in a very light colored ink which will not significantly distort the graphic image. Alternatively, pattern 18 may be encoded in an ink that is sensitive to ultraviolet light and virtually transparent to visible light. In either case, pattern 18 should be placed over graphic image 17 in a manner that would not obscure or distort that image.

The precise content of the information in pattern 18 is not critical to this invention but would preferably relate to record 16. For example, that information could relate to the holder of the item. If record 16 were a driver's license, the information could indicate that the owner of the driver's license was not authorized to drive without corrective lenses. If record 16 were a passport, the information could indicate that the holder of the passport has visited certain countries.

The information could also relate to the record itself. For example, the code on the visa could indicate that the visa was a traveller's visa that expired on a certain date.

The advantage of the coded information overlaying the photograph is that such an arrangement would make it extremely difficult to change the information on the photograph without detection. Any changes to the information would be reflected in a change to the photograph, and changes to the photograph would cause changes to the information.

As another example of the benefits of this invention, the code could relate to the photograph itself. For example, the encoded information could include data on eye color, hair color, and sex, as well as height and weight of the holder. Alternatively, the data could be a type of "faceprint" in which certain relationships in the face are encoded to identify the owner uniquely.

Such a record would hinder fraudulent identification involving the replacement of a photograph on a record used for identification. If done, this replacement may go undetected. If coded information were placed over the photograph that described the picture in the photograph, then such fraud would be much more difficult to practice.

The record 16 may also have additional human-readable data 20 on it, such as some text or a seal. Preferably, the human-readable data would not obscure or distort pattern 18.

The record 16 need not even be a small item, such as a driver's license or a passport. Record 16 could be a large document with a graphic image, and the principles of the invention could still be used to obtain its advantages.

These types of records are exemplary only and not intended to limit the invention beyond its allowable scope. Instead, it will be apparent to those of ordinary skill how the inventive concept can be realized in a large number of applications.

Figure 1B:
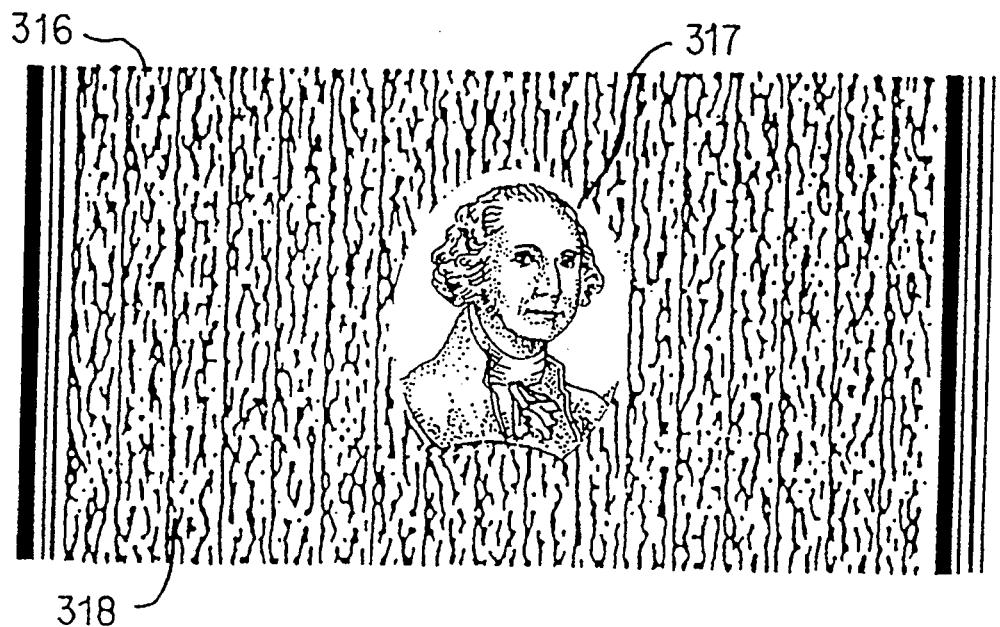
FIG. 1B is a diagram of a portion of a bearer bond having both data words and image words.

Graphic images and encoded data can be interrelated in another way as well. FIG. 1B shows a portion of a record 316, which is shown as a bearer bond but could as well be another instrument, such as a stock certificate. In FIG. 1B, record 316 includes an information portion 318, which includes a pattern of encoded data, and a graphic image portion 317, which has a distinctive picture. Preferably, the information in pattern 318 would contain a plurality of information words, such as codewords in the PDF417 code discussed below.

Figure 1C:
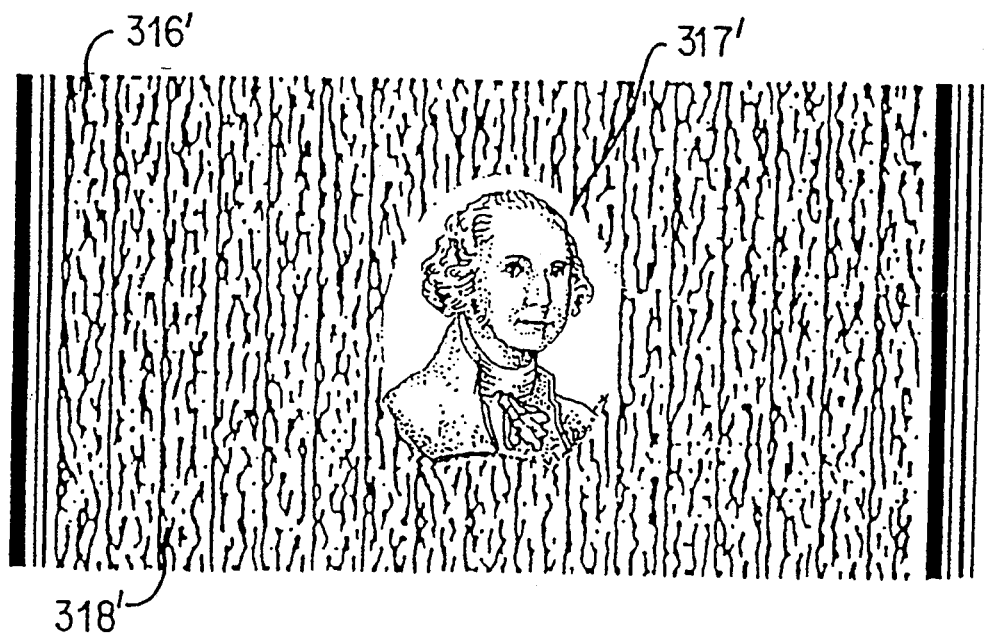
FIG. 1C is a diagram of the bearer bond in FIG. 1B after having been modified to reflect a redemption.

Information portion 318 may contain encoded data which identifies the owner of record 316, or may contain certain other data about record 316, such as a unique identification code and its value at certain anniversary dates. Information portion 318 can also include data about redemptions. In this embodiment, each time the bearer bond was redeemed or some other action was taken, a slight change would be made to the information words in area 318 and to the image portion 317. The result would be a new record 316' as shown in FIG. 1C with an information portion 318' and an image portion 317' which differed slightly from the corresponding areas of record 316. The advantage of using bonds or other records in this way would be to thwart counterfeiting. Appropriate equipment would detect an attempt to duplicate record 316 in order to redeem it multiple times.

For example, a reader of such bonds would be used when record 316 was redeemed, and a central computer coupled to that reader would note such redemption to preclude redemption of an identical bearer bond.

Image portion 317 in FIG. 1B preferably consists of several image words which have alternating black and white areas to effect a desired shading. The shading produced by the image words would appear as the picture on the record. In FIG. 1B, the picture in image portion 317 is of George Washington which would preferably be represented by several image words. The change made to image portion 317 when bearer bond 316 is redeemed should be so slight as to make it nearly impossible to detect differences between image portions 317 and 317'.

Figure 1D:
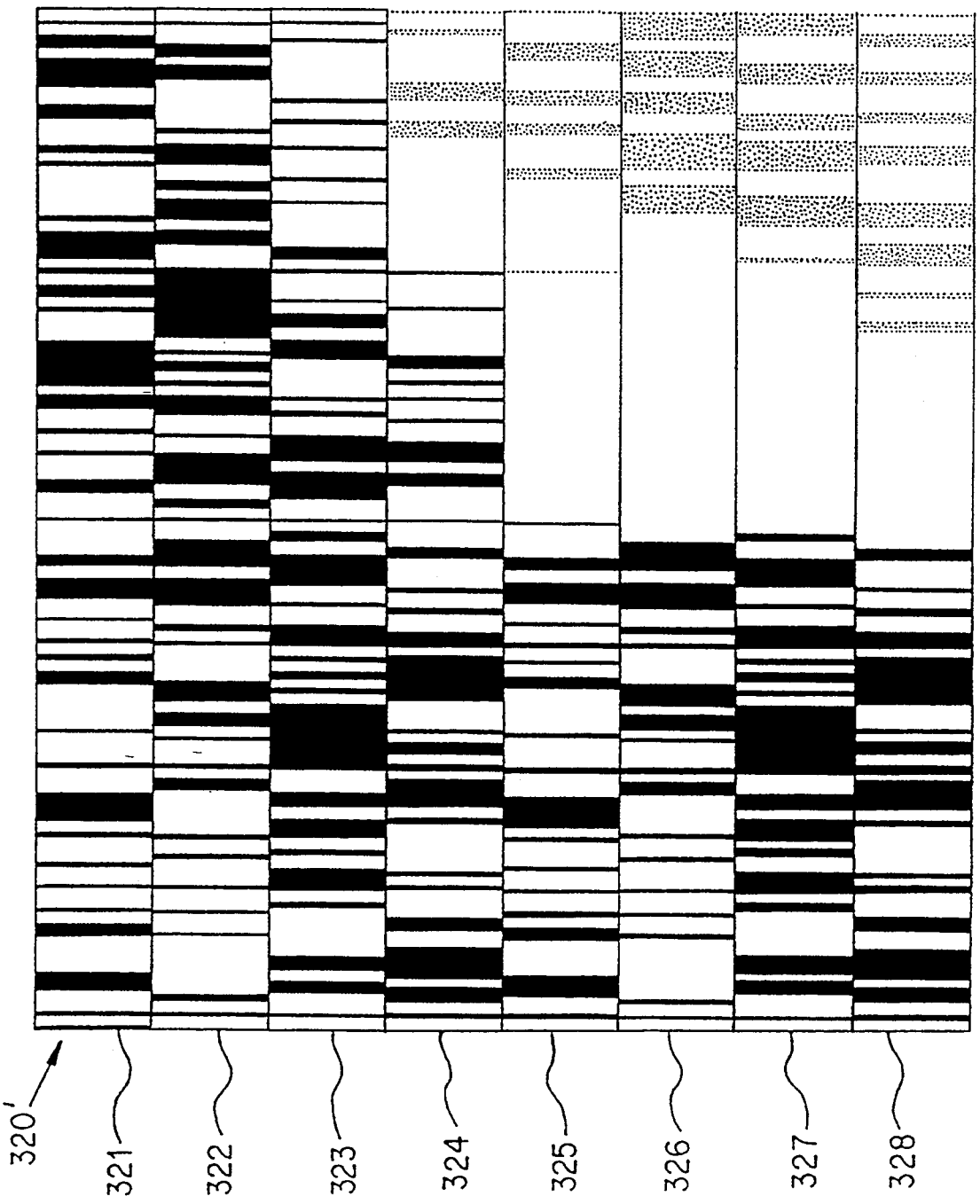
FIG. 1D is an enlarged view of a portion of the bearer bond in FIG. 1B.

FIG. 1D shows a section 320 of either record 316 or 316' in great detail to illustrate one mechanism of implementing an embodiment of this invention. Section 320 represents a rectangle which includes the upper left hand corner of image portion 318 or 317', and the surrounding areas in information portion 318 or 318'. The record has several rows 321, 322, 323, 324, 325, 326, 327, and 328. Rows 321 and 322 contain only information words. Rows 323, 324, 325, 326, 327 and 328 contain a sequence of information words followed by a sequence of image words. As explained above, the shading of the image words reflect the shading of the image, whereas the information words contain encoded data.

Preferably each row has a field at one or both ends indicating the lengths of the alternating sequences of information words and image words. The length of a sequence of information words can be designated by the number of such words. The lengths of a sequence data words can be designated by absolute lengths. The purpose of the fields is to identify information words for devices reading the rows, so those devices do not decode image words. This can also be obtained by using start and stop symbols at the beginning and each of each sequence of information words.

The fields in the rows can also contain other information, such as row number, to help identify desired locations in record 316. This is particularly important when modifying records after redemption.

Code PDF417

Before discussing the method and apparatus for encoding and decoding data in machine readable graphic form, such as the two-dimensional bar code PDF417, it is important to understand the structure of the two-dimensional bar code symbol itself.

Each PDF417 symbol is composed of a stack of rows of bar-coded information. Each row in the symbol consists of a start pattern, several symbol characters called "codewords," and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 2:
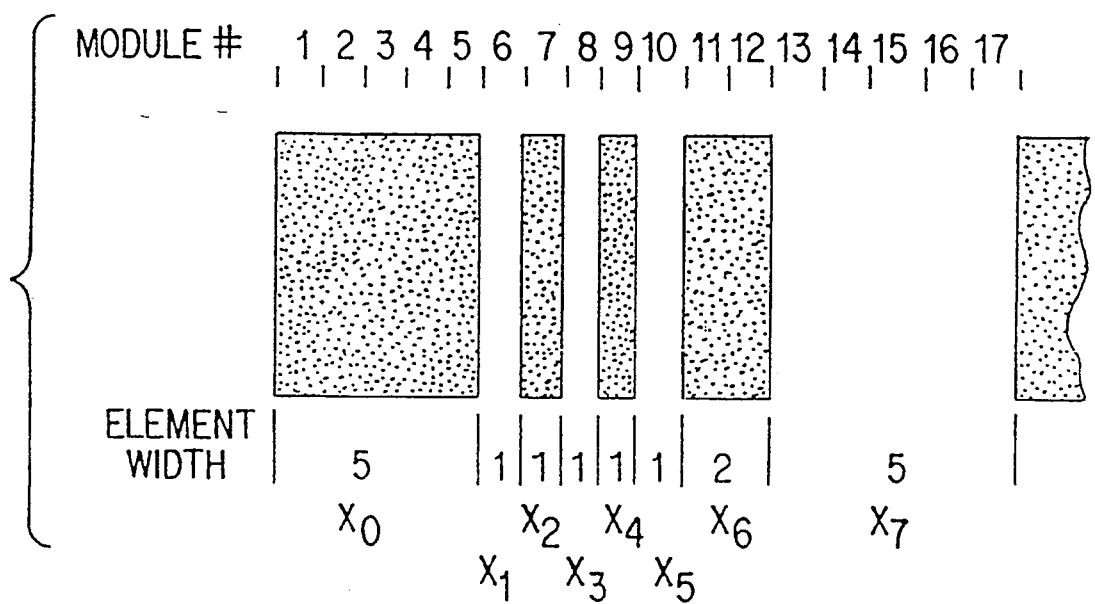
FIG. 2 is a diagram illustrating one example of a codeword in PDF417.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight-digit sequence, which represents the four sets of alternating bar and space widths within the codeword. This is called the "X-sequence" of the codeword and may be represented by the sequence $X_0, X_1, ...X_7$. For example, for an X-sequence of "51111125", the first element is five modules wide, followed by five elements one module wide, one element two modules wide, and the last element five modules wide. This example is illustrated in FIG. 2.

The set of possible codewords is further partitioned into three mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

$$\text{cluster number} = (X_0 - X_2 + X_4 - X_6) \bmod 9$$

where "mod 9" is the remainder after division by nine. Referring to the codeword in FIG. 2, the cluster number is calculated as follows:

$$\text{cluster} = (5 - 1 + 1 - 2) \bmod 9 = 3$$

To minimize error probabilities, PDF417 uses only three clusters, even though nine are mathematically possible. Thus, each row uses only one of the three clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

$$\text{cluster number} = ((\text{row number}) \bmod 3) * 3$$

There are 929 codeword values defined in PDF417. These values are 0 through 928. Each cluster presents the 929 available values with distinct bar-space patterns so that one cluster cannot be confused with another.

Figures 3, 4:
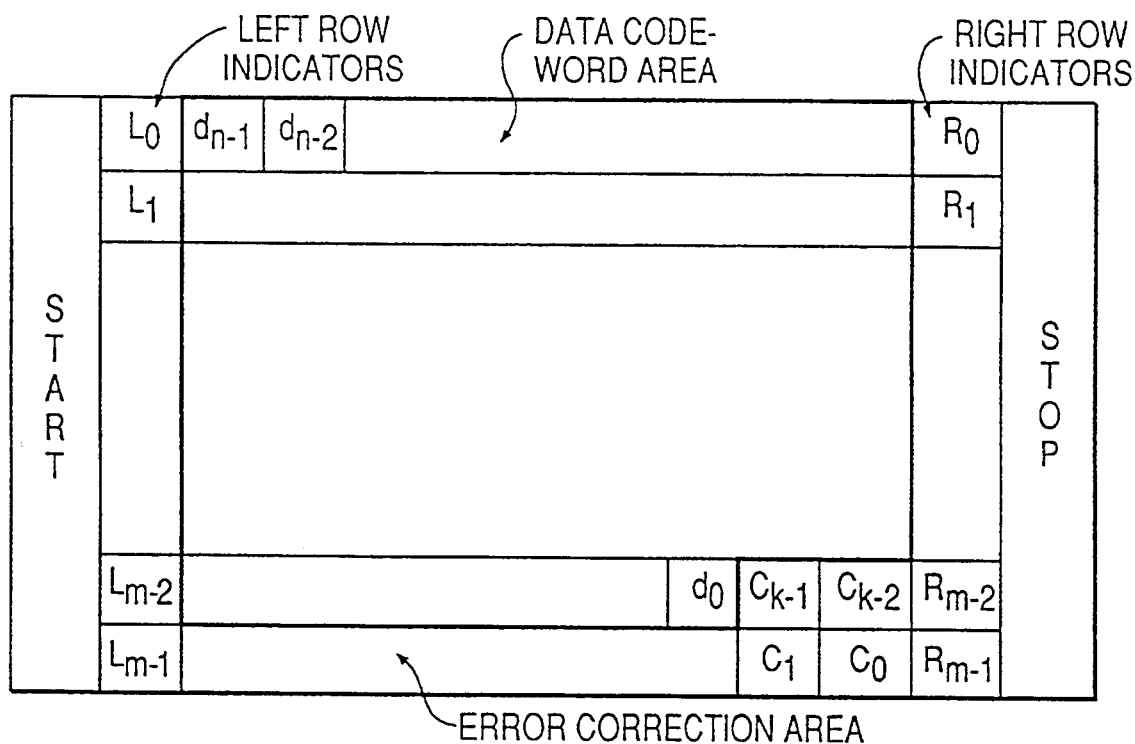
FIG. 3 is a diagram illustrating the overall structure of a PDF417 symbol.
FIG. 4 is a table listing the number of error correction codewords for a given security level in PDF417.

FIG. 3 is a block diagram showing the overall structure of a PDF417 symbol. Each row of the symbol consists of a start pattern, a left row indicator codeword $L_i$, data codewords $d_i$ or error detection/correction codewords $C_i$, a right row indicator codeword $R_i$, and a stop pattern. The minimum number of codewords in a row is three, including the left row indicator codeword, at least one data codeword, and the right row indicator codeword. The right and left row indicator codewords, which are discussed further below, help synchronize the structure of the symbol.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique X-sequence of "711311121".

Every symbol contains one codeword (the first data codeword in row 0) indicating the total number of codewords within the symbol, and at least two error-detection codewords $C_0$ and $C_1$. These two error-detection codewords together form a checksum which is two codewords long.

Figure 5:
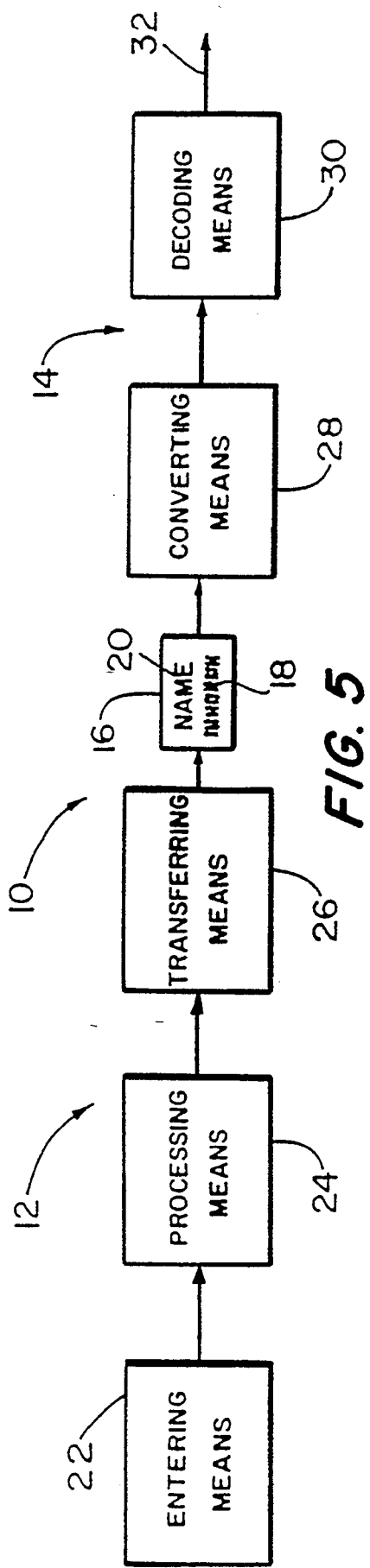
FIG. 5 is a block diagram of a system for printing and reading codes including an image.

A PDF417 symbol can also encode data with error correction capability. The level of error correction capability, called the "security level," is selected by the user and ranges from 0 to 8. This means, for example, that at level 6, a total of 126 codewords can be either missing or destroyed and the entire symbol can be read and decoded. FIG. 5 is a table showing the relationship between the security level of the PDF417 symbol and the number of error correction codewords $C_i$.

In addition to correcting for missing or destroyed data (known as "erasures"), PDF417 can also recover from misdecodes of codewords. Since it requires two codewords to recover from a misdecode, one to detect the error and one to correct it, a given security level can support half the number of misdecodes that it can of undecoded codewords.

This error correction feature is particularly useful when information in PDF417 format overlays a graphic image. Because, as explained above, the encoded information should not obscure or distort the image, the ink used for information must be light colored. This creates the possibility that the graphic image will distort portions of the encoded information. If that happens, errors can be corrected with the PDF417 two-dimensional bar code.

The row indicator codewords in a PDF417 symbol contain several key components: row number, number of rows, number of data columns, and security level. Not every row indicator contains every component, however. The information is spread over several rows, and the pattern repeats itself every three rows. The pattern for encoding the information in the row indicator codewords can be illustrated as follows:

Row 0: $L_0$ (row #, # of rows)        $R_0 L_2$ (row #, # of columns)
Row 1: $L_1$ (row #, security level)   $R_1 L_0$ (row #, # of rows)
Row 2: $L_2$ (row #, # of columns)     $R_2 L_1$ (row #, security level)
Row 3: $L_0$ (row #, # of rows)        $R_3 L_2$ (row #, # of columns)
etc.

In other words, the left row indicator codeword $L_0$ for the first row 0 contains the row number (0) and the total number of rows in the symbol. The right row indicator codeword $R_0$ for row 0 contains the row number (0) and the number of data columns in the symbol, and so on.

Encoding data into a PDF417 symbol is typically a two-step process. First, data is converted into codeword values of 0 to 928, which represent the data. This is known as "high-level encoding." The values are then physically represented by particular bar-space patterns, which is known as "low-level encoding."

Encoding/Decoding System

Figure 6:
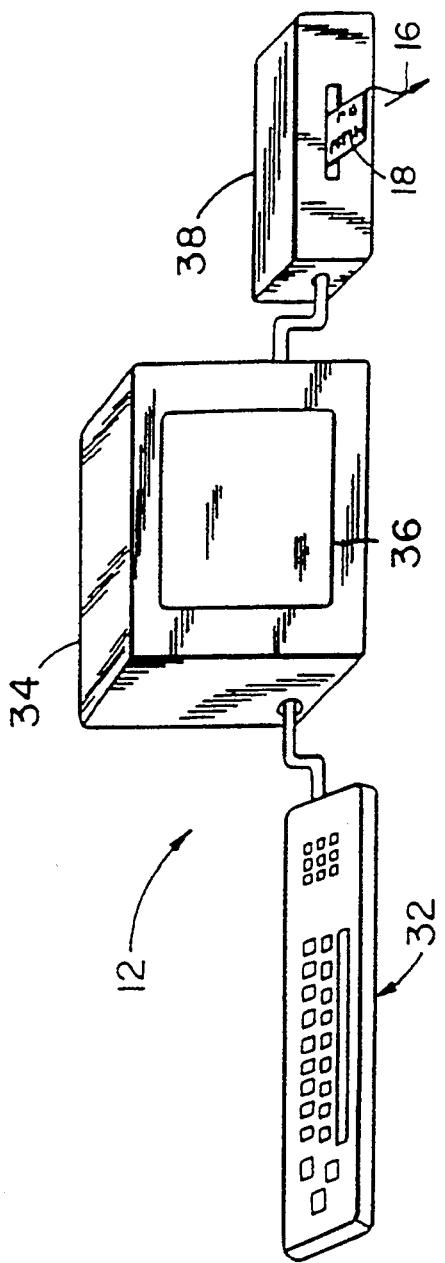
FIG. 6 is a perspective view of an encoding means of the system in FIG. 5.
Figure 7:
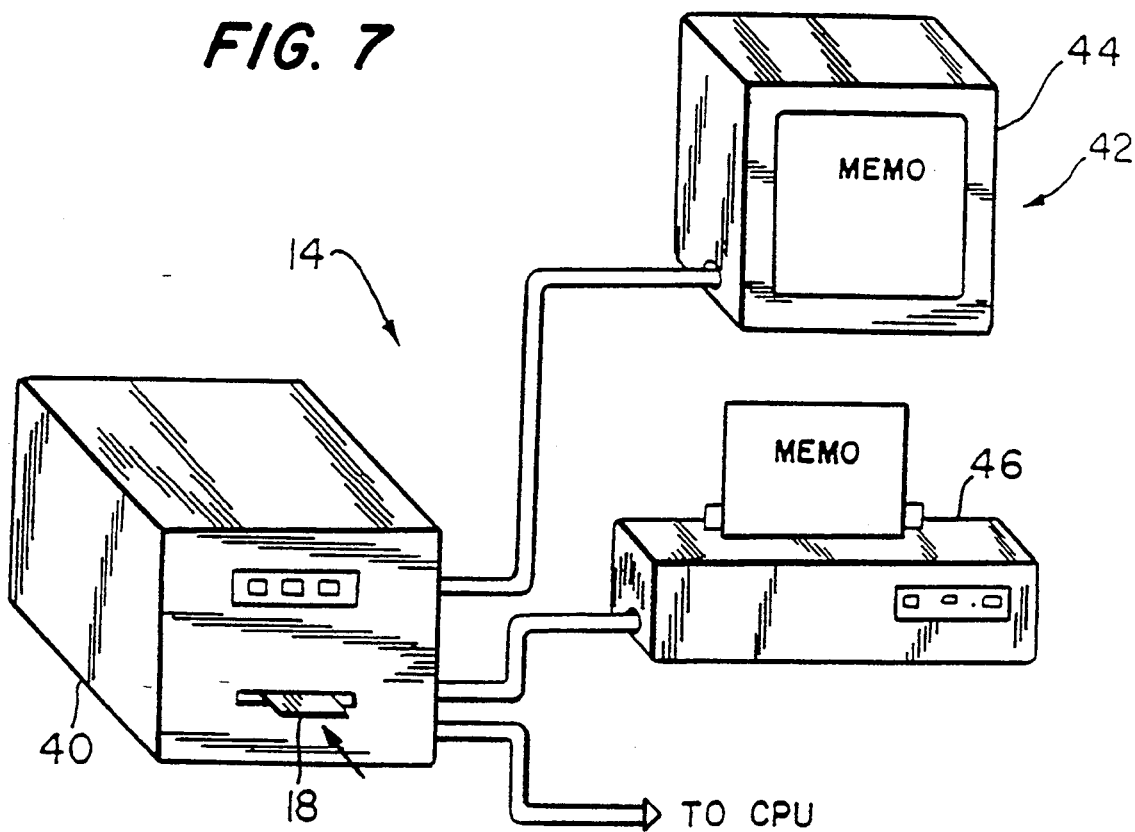
FIG. 7 is a perspective view of a recognition means of the system in FIG. 5.

Encoders and decoders are discussed more completely in U.S. Ser. No. 07/851,493, which is herein incorporated by reference. Referring now to FIGS. 5-7 in the drawings, FIG. 5 is a block diagram of the system 10 for representing and recognizing data or a record in machine readable graphic image form. System 10 includes an encoding means, generally indicated by the reference numeral 12, and a recognition means, generally indicated by the reference numeral 14. Encoding means 12 produces a record 16 (see FIG. 1A), such as a driver's license, visa, or passport, with a photograph. Overlaying the photograph would be data encoded in a two-dimensional pattern 18. Record 16 may also contain human readable data 20, such as text. The two-dimensional pattern 18 on record 16 is recognized by recognition means 14 to produce output signals representative of the data encoded into the pattern 18.

Data to be encoded into the two-dimensional pattern 18 on record 16 is entered into the encoding means 12 by entering means 22. The data entered by entering means 22 may include both data to be encoded into the two-dimensional pattern 18 and the data to appear on record 16 in human readable form. That data can even include the photograph or image. Processing means 24 encodes the set of data into a two-dimensional pattern 18 and generates transfer drive signals for controlling the transfer of the indicia onto the record 16. Transferring means 26 transfers an image of the two-dimensional pattern 18 onto record 16 in response to the transfer drive signals. Preferably, transferring means 26 includes a printer which transfers either light-colored ink or ultraviolet-light sensitive ink as explained above.

If human readable data is also to be transferred onto record the processing means 24 generates a second set of transfer drive signals for controlling the transfer of the human readable data onto record 16. A portion or all of the data to be encoded and the human readable data may be transferred from a storage memory in processing means 24 or other computer files rather than being entered by means 22.

Recognition means 14 includes converting means 28 that converts the image on record 16 into electrical signals representative of the graphic indicia. Decoding means 30 decodes the electrical signals into decoder output signals, indicated at 32, that are representative of the data encoded into the pattern 18.

FIG. 6 is a perspective view of one embodiment of encoding means 12. The embodiment of FIG. 6 is for illustrative purposes, and not meant to limit the scope of the invention. In this embodiment, the entering means 22 of FIG. 5 is shown in form of a keyboard 32 for entering alphanumeric and graphic data into the encoding means 12. Entering means 22 may take forms other than a keyboard, such as an optical scanning means for scanning data directly from documents for entry into the encoding means 12.

Referring again to FIG. 6, the processing means 24 of FIG. 5 is shown in the form of a processor and display unit 34. The data entered by keyboard 32 is transmitted to the processor and display unit 34 for storage and processing. In addition to entering data, the keyboard 32 is also used for entering control commands to effect operation of the processor unit 34.

The data entered by keyboard 32 is preferably displayed on display screen 36, and upon entry of a proper control command, is also stored in memory. The data to be encoded into the pattern 18 is stored in a first memory in processor 34, and the data, if any, to be transferred in human readable form is stored in a second memory. Alternatively, both data may be stored in a separate portion of a single memory. Upon the appropriate control command from keyboard 32, the processor unit 34 encodes the data in the first memory into a two-dimensional pattern 18 and generates first transfer drive signals representative of the data stored in the first memory. The processor unit 34 also generates second transfer drive signals representative of the data stored in the second memory.

The processor unit 34 is shown in FIG. 6 as being coupled to a printer 38. Printer 38 is one form of the transferring means 26 of FIG. 5. Printer 38 transfers an image of the two-dimensional pattern 18 on record 16 in response to the first transfer drive signals and prints the second set of data in human readable form onto record 16 in response to the second transfer drive signals.

Turning now to FIG. 7, the recognition means 14 includes a card reader 40 which contains the converting means 28 and the decoding means 30 of FIG. 5. The use of appropriate converting means that corresponds to the particular data encoding technology employed is contemplated by the present invention.

The converting means 28 may be a bar code reader such as those disclosed in U.S. patent application Ser. Nos. 317,433 and 317,533, and incorporated herein by reference, which can read the ink used by printer 38. The readers disclosed in the above patent applications are open system devices designed to read an optically encoded two-dimensional bar code and to convert the light reflected from the pattern into electrical signals representative of the graphic indicia.

The decoding means 30 decodes the electrical signals into output signals representative of the data encoded onto record 16. The decoder output signals are outputted from the recognition unit 40 to various output means 42. FIG. 7 depicts two examples of output devices, one being a display unit 44 and the other a printer 46. Display unit 44 may be any suitable display such as liquid crystal display or a CRT. The printer 46 may be any print device such as a dot matrix printer, laser printer, etc.

The system maximizes the use of available space for encrypting data. The density of the encoded data is such that for a two-dimensional bar code symbol, a minimum of about 1600 characters can be encoded into a space of approximately $5'' \times \frac{1}{2}''$. In addition to being compact, the system provides for high security in the transmission of information.

Although the encoding means 12 and the recognition means 14 are shown in FIGS. 5-7 as separate devices, they can be in the same device. This is particularly useful when a record 316 (FIG. 1B) is read and modified. In such cases it would be useful to have a single unit for both purposes.

Figure 5A:
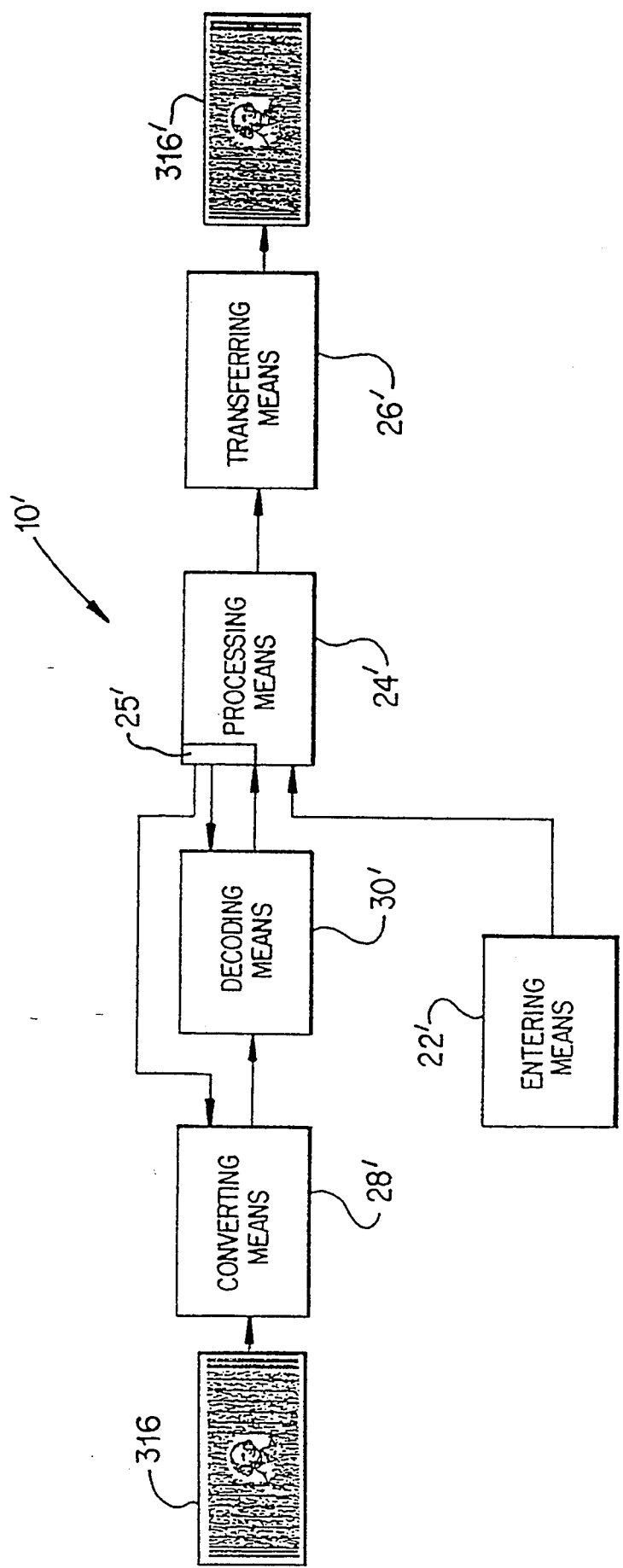
FIG. 5A is a block diagram of a system for reading, modifying and reprinting a record or a label.

FIG. 5A shows a block diagram of a system 10' for use with record 316 in FIG. 1B. System 10' includes elements that correspond to those of system 10 shown in FIGS. 5-7. Specifically, system 10' includes a converting means 28' which converts the encoded data from record 316 into electrical signals, and a decoding means 30' which decodes those signals. Processing means 24' then reads the decoded signals and, based upon certain criteria, cause transferring means 26' to print appropriate output signals to modify record 316 (FIG. 1B) into record 316' (FIG. 1C).

The slight variations could be determined in a variety of ways. For example, if record 316 is a bearer bond on a stock certificate, processing means 24' could be a large computer or a computer network which keeps track of redemptions. Processing means 24' could also receive data on either the interpretation of the information or the printing of the information using entering means 22'.

Processing means 24' also preferably includes alignment means 25' for locating selected areas of record 316 for reading a printing. Alignment means 24' interprets fields that identify rows and particular words in those rows. Although alignment means 25' is shown as part of processing means 24', it could also be a microprocessor in either converting means 28' or transferring means 26'.

Figure 8:
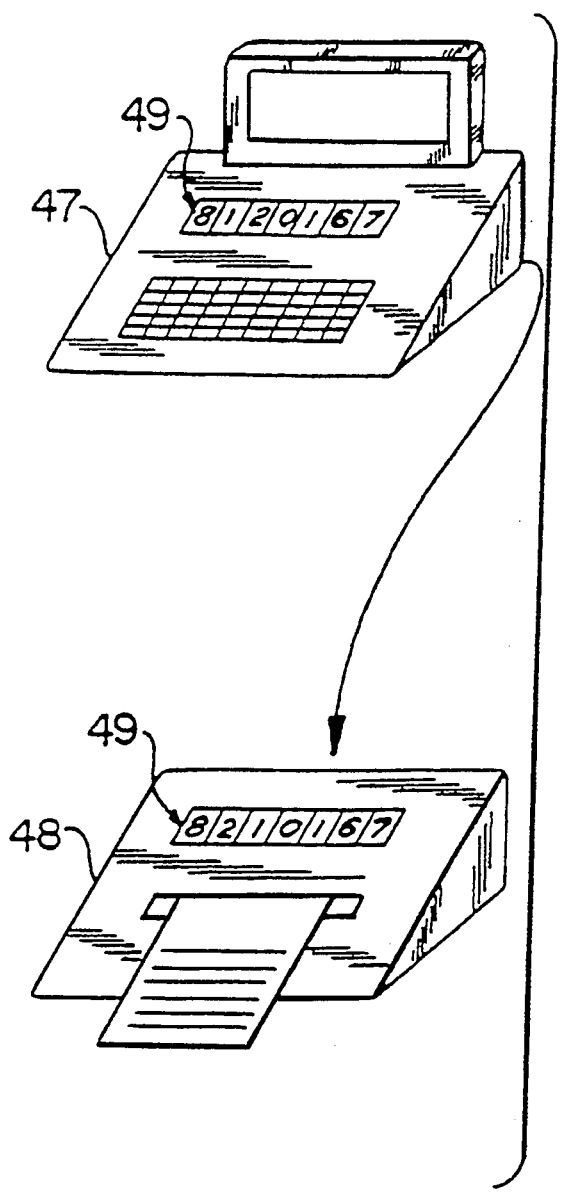
FIG. 8 is a perspective view of a data entry device and reader in which a key may be entered for encrypting and decrypting data.

Data may also be encoded using a keyed encryption algorithm that may be accessed only by an encryption key. As shown in FIG. 8, the data entry means 47 contains the keyed algorithm and upon entry of the key 49, the data will be encoded into a two-dimensional graphic pattern in a unique configuration. The unique configuration can only be read by a reader 48 having the proper algorithm, and only upon entry of the key 49 into the reader. Thus, a high degree of security may be provided with the keyed encryption embodiment.

Another feature of the present invention is to have the image on record 316' be a "digital signature" which is embedded as the PDF 417 bar code in encrypted form. The printer which created the two dimensional digital signal would then use a keyed encryption algorithm that could be accessed only by an encryption key. By use of a keyboard or other data entry means which had the keyed algorithm, and upon entry of the key, the data entered as plain text on a keyboard would be encoded into the two dimensional graphic pattern in a unique decoded configuration. The unique pattern or code configuration could only be decoded and read by a reader having the algorithm and only upon entry of the identical key into the reader. This provides a high degree of security for applications needing such security.

A low-level decoder may be embodied in a computer program operating on a microcomputer separate from the host computer. The low-level decoder would be preferably connected to the host computer by a standard interface, such as an RS-232 interface, for transmitting the codeword values after they are decoded. Alternatively, the low-level decoder could be embodied entirely in hardware, or a combination of a hardware and software, which is physically located in either the scanner itself or the host computer.

The matrix of codeword values from low-level decoder is decoded into usable data by a high-level decoder, which may be embodied as a separate computer program operating on the host computer. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per codeword), and in Numeric mode, the numeric data can be packed in almost triple density. Therefore, the high-level decoder in host computer 112 will further decode the codeword values (0–928) from low-level decoder 114, depending on the mode, to obtain the actual data embodied in the symbol. The decoded data from the high-level decoder may then be used by a user application program also operating on the host computer 112.

Figure 9:
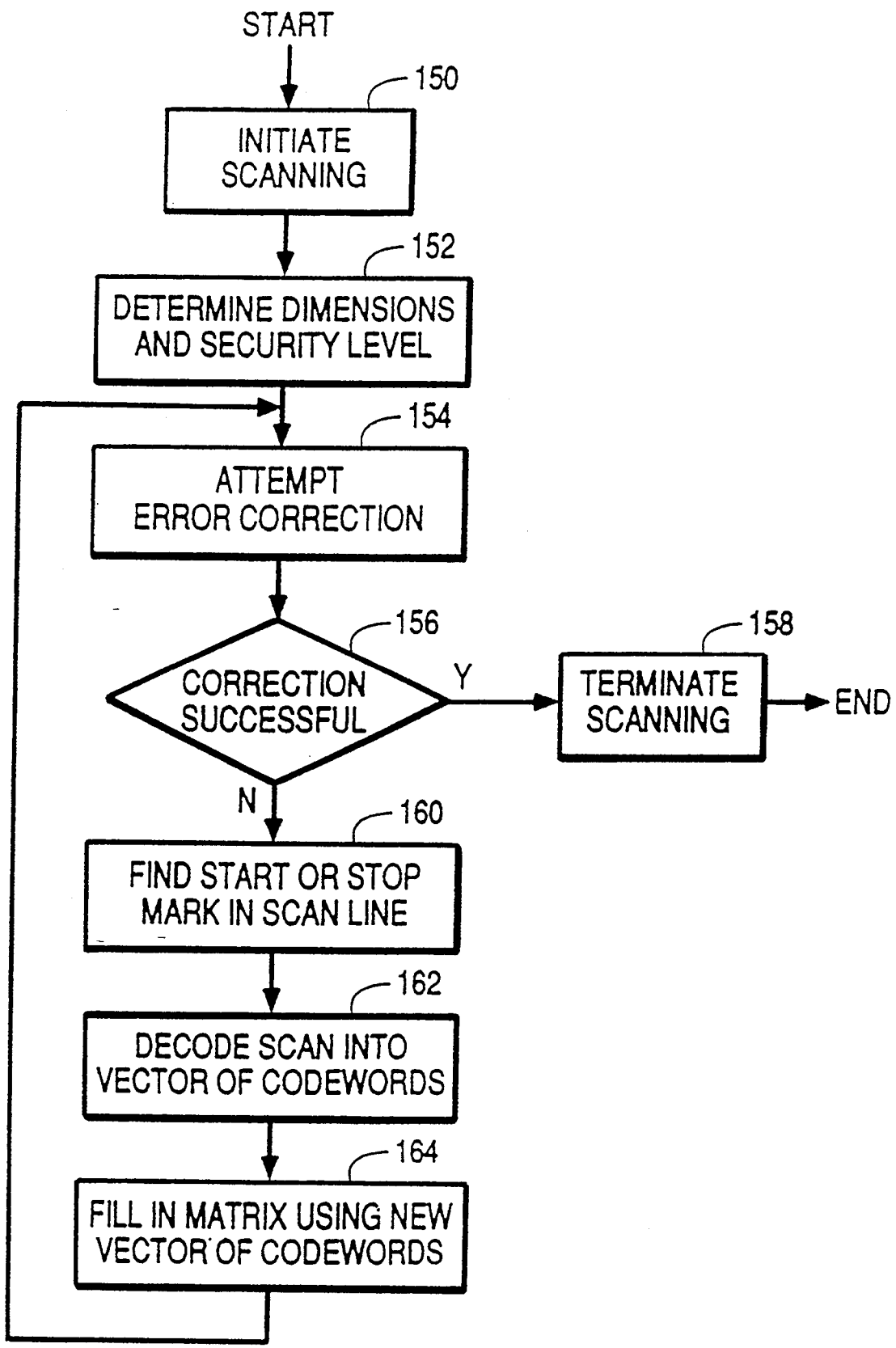
FIG. 9 is a flow diagram of the steps performed by the low-level decoder for decoding a two-dimensional bar code symbol.

FIG. 9 is a flow chart showing the sequence of operation of a low-level decoder for decoding a two-dimensional bar code symbol such as PDF417 into a matrix of codeword values. The various steps in the sequence are embodied in a software computer program which is stored and executed by processor 34.

In the first step 150 in FIG. 9, the low-level decoder initializes the scanner interface and initiates scanning of the symbol. The actual functions performed in this step will depend on the type of scanner and will involve various scanner-dependent routines to initialize the scanner interface and to start scanning.

In step 152, the low-level decoder attempts to determine the dimensions and the security level of the symbol being scanned. Specifically, this step determines the number of rows, the number of data columns, and the security level of the symbol from the left and right row indicator codewords. These dimensions are then used to initialize a two-dimensional codeword matrix and other related parameters for decoding the symbol. Each location in the matrix contains both a codeword value and an associated confidence weight, which are initially set to a null or empty value. If the dimensions and security level of the symbol cannot be determined, then the scan is aborted. This step will be discussed in further detail below in connection with FIG. 10.

Continuing in FIG. 9, step 154 is the first step in a control loop in which the rows of the two-dimensional bar code symbol are repeatedly scanned and the codeword values are filled into the codeword matrix. The steps of the control loop are each repeated until the number of codewords remaining in the matrix which have not been successfully decoded is small enough that the rest of the matrix can be determined using the built-in error correction capability of the symbol. Thus, in step 154, if the number of codewords which have not been successfully decoded is less than the error correction capability of the symbol based on the security level (see FIG. 4), an attempt is made to correct the matrix using the error-correction codewords. If the attempted error correction is successful, then in step 156, the control loop is exited and scanning is terminated in step 158. Otherwise, if the attempted error correction is not successful, then the following steps 160-164 are performed to try to decode additional codewords to fill in the matrix.

First, step 160 searches a scan line of data obtained from the buffer area of the memory for a start or a stop pattern. If either a start or a stop pattern is found, then in step 162, the low-level decoder attempts to decode as many codewords as possible from the scan line. Specifically, the scan line of data is parsed into individual codewords whose values and cluster numbers are placed in a codeword vector ready for incorporation into the codeword matrix. Both steps 160 and 162 are discussed in further detail below in connection with FIGS. 11 and 13, respectively.

The codeword vector produced in step 162 is analyzed and then used to update the codeword matrix in step 164. In particular, step 164 assigns a confidence weight to each codeword value depending on whether its nearest neighbors were also decoded. Row numbers are also assigned to each codeword value based on the left or right row indicator codewords and the corresponding cluster number for the codeword. If the scan line crosses a row boundary, the cluster numbers of the codewords can be used to determine the correct row number for each individual codeword. For example, if a decoded scan line has a left row indicator with row number 2, and the cluster numbers of the following codewords are 6, 0, 0, 3, the codewords are accordingly placed in the following locations: (row 2, column 1); (row 3, column 2); (row 3, column 3); and (row 4, column 4). In this way, a single scan line of data can contain codewords from more than one row, which can then be stitched into the appropriate location in the codeword matrix. This step is discussed in further detail in connection with FIGS. 16A and 16B below.

Figure 10:
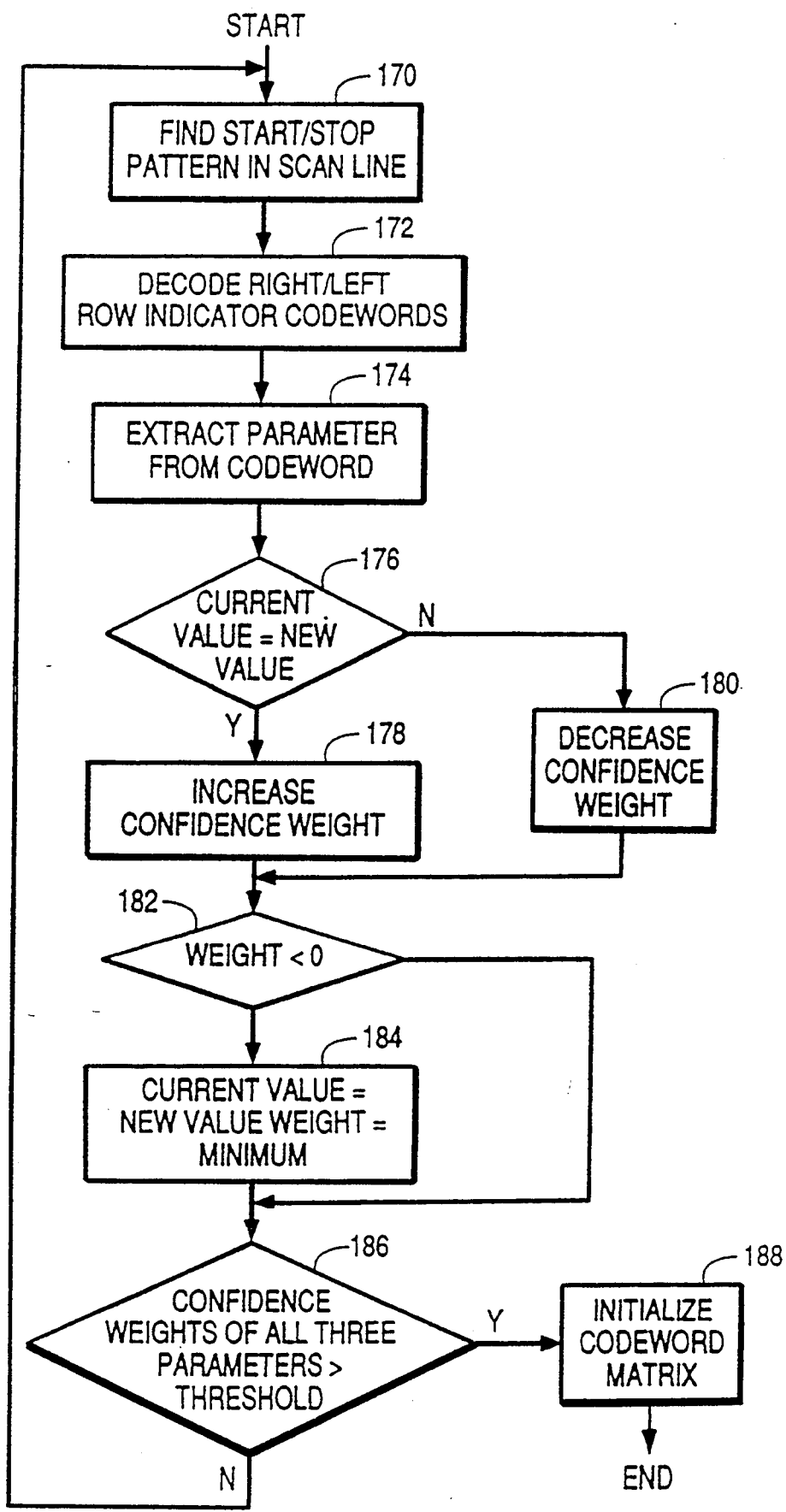
FIG. 10 is a flow diagram of the steps performed by the low-level decoder for determining the dimensions and security level of the symbol being scanned.

FIG. 10 is a flow chart showing in greater detail the sequence of steps for determining the dimensions and security level of a symbol as referred to in step 152 of FIG. 9 above. In the first step 170 of FIG. 10, the low-level decoder searches a scan line of data obtained from the buffer area of the memory for a start or a stop pattern. This step is the same as step 160 in FIG. 9 and is discussed in further detail in connection with FIG. 11 below.

Step 172 then decodes the first codeword immediately adjacent to either the start or stop pattern found in the previous step. As shown in FIG. 3, this codeword will be either a left or right row indicator codeword containing the row number and either the number of rows, the number of data columns, or the security level of the symbol. If both a start and a stop pattern are found, then both the left and the right row indicators are decoded. The sequence of steps for decoding an individual codeword are discussed further below in connection with FIG. 15.

Continuing in FIG. 10, in step 174 the particular dimension or security level encoded in the row indicator is extracted from the codeword value and the cluster number determined in the previous step 172. For example, for a left row indicator codeword with a cluster number of 0, the number of rows is extracted from the codeword value.

A confidence weight assigned to each of the dimensions and the security level is initially set to 0. Steps 176-184 update both the current value and the confidence weight of the dimension or security level extracted in the previous step in the following way. First, the particular parameter, say the number of rows, is compared to the current value of the number of rows obtained from previous decodes. If the current value of the number of rows and the newly decoded value are the same, as determined in step 176, then the confidence weight assigned to the number of rows is increased in step 178. If the current value and the newly-decoded value are different, however, then the confidence weight is decreased in step 180. If the confidence weight assigned to the particular parameter is decreased below zero as determined in step 182, then the newly decoded value is substituted for the current value and a new minimum weight is assigned to the parameter in step 184.

Step 186 determines whether the confidence weight for all three parameters, i.e., number of rows, number of data columns, and security level, exceeds a predetermined threshold. If so, then the two-dimensional codeword matrix is initialized in step 188 based on the current values of the number of rows and the number of columns. The number of correctable errors may also be determined from the current value of the security level according to the table in FIG. 4. If all three confidence weights do not exceed the threshold in step 186, however, then program control returns to step 170 to begin searching for the start and stop patterns in a new scan line. Steps 170-184 are repeated until all three parameters have been successfully decoded with a high degree of confidence.

Figure 11:
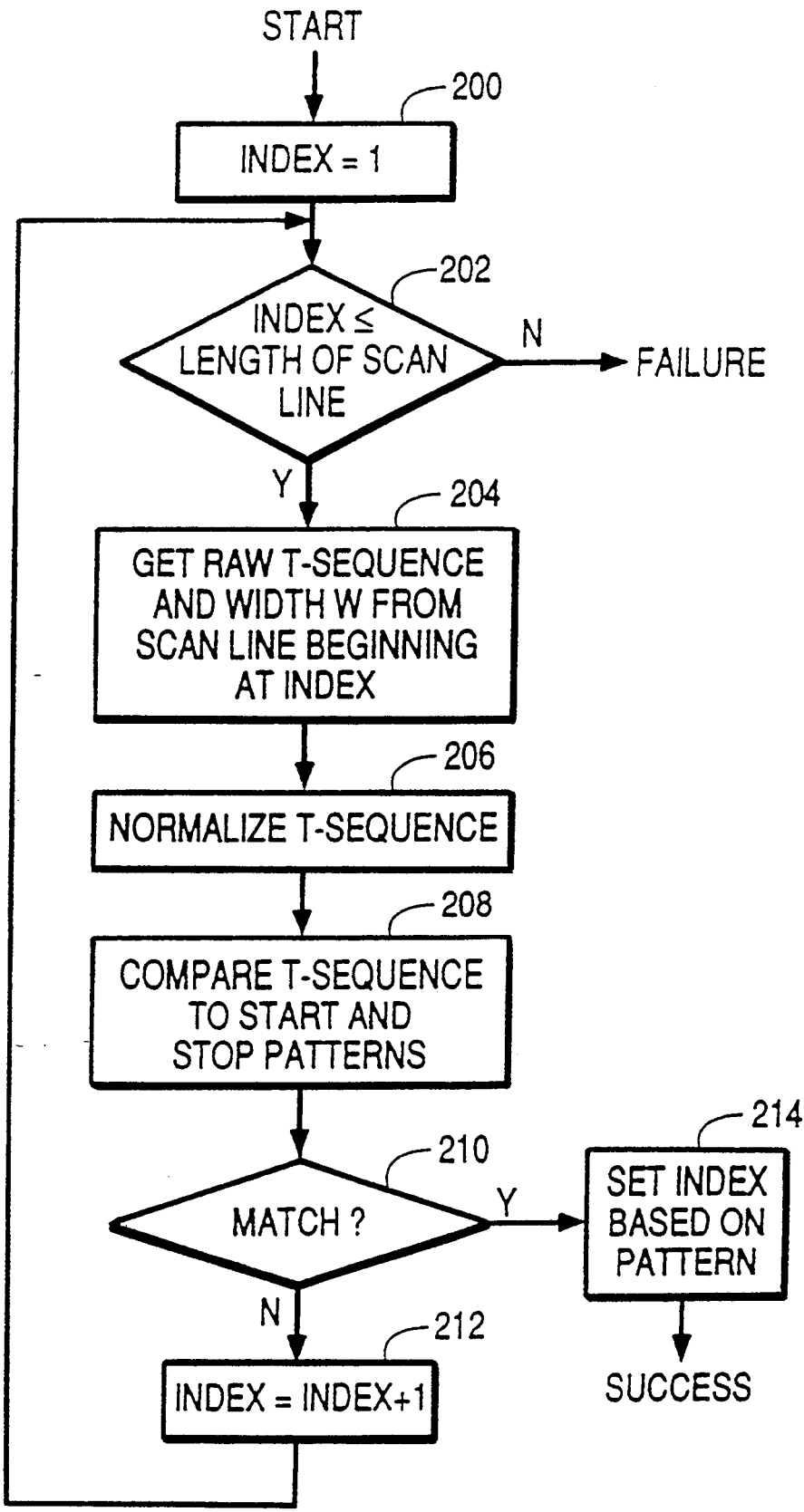
FIG. 11 is a flow diagram of the steps performed by the low-level decoder for searching a scan line of data for a start or a stop pattern.

FIG. 11 is a flow chart showing in greater detail the sequence of steps for searching a scan line of data for a start or stop pattern as referred to above in step 160 of FIG. 9 and step 170 of FIG. 10. Briefly, the search begins at the first location of an individual scan line of data obtained from the buffer area of the memory and is repeated at sequential locations until either a match is found or the length of the scan line is exceeded. When a match is found, an index is set to a location immediately following or preceding the pattern for decoding the adjacent codeword.

As shown in FIG. 11, the first step 200 sets an index to the location of the data elements in the scan line to "1," indicating the first data element or integer value of the scan line. This index is used to identify the first element of each sequence of eight elements in the scan line for comparison to the start and stop patterns.

Step 202 is the first step of an iterative loop for searching the scan line from left to right for either a start or a stop pattern. In this step, if the current index is less than the length of the scan line, then the remaining steps are executed and the search continues. Once the index exceeds the length of the scan line, however, then the loop is exited and an indication is returned signifying that the search failed and a start or stop pattern was not found.

Rather than using the X-sequence of codeword, the low-level decoder decodes a symbol by using "edge to similar edge" measurements to compensate for ink spreading which occurs when printing the symbols. Thus, in step 204, a raw "t-sequence" is obtained from the scan line by adding pairs of consecutive integer values beginning at the location specified by the index. Specifically, the raw t-sequence, which corresponds to the seven width measurements $t_1, t_2, ... t_7$ shown in FIG. 12, is calculated by adding pairs of the consecutive integer values $x_0, x_1, ... x_7$, representing the widths of the bars and spaces, as follows:

$$t_1 = x_0 + x_1$$
$$t_2 = x_1 + x_2$$
$$t_3 = x_2 + x_3$$
etc.

A width W for the entire codeword is also calculated in step 204 by summing the eight integer values $x_0 + x_1 + ... + x_7$.

Figures 12, 14A, 14B, 14C:
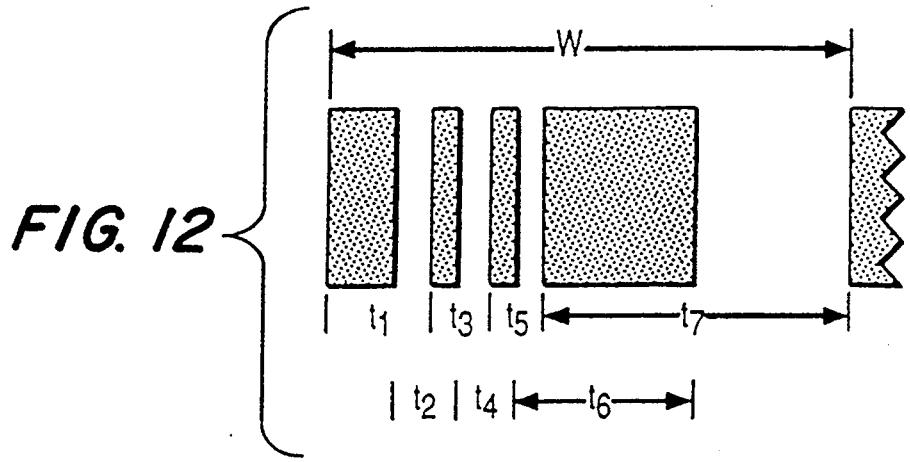
FIG. 12 is a diagram illustrating the various width measurements that are used for the "t-sequence" of a codeword.
FIGS. 14A, 14B, and 14C are diagrams showing an example of a codeword vector.

For the codeword in FIG. 12, for example, the sequence of integer values from the scan line, representing the widths of the bars and spaces might be something like: 43, 19, 21, 19, 22, 18, 103, 96. The raw t-sequence $t_1, t_2, ... t_7$ would then be 62, 40, 40, 41, 40, 121, 199, and the width W would be 341.

In step 206 in FIG. 11, the raw t-sequence obtained in step 20 204 is normalized and rounded to integer values. Specifically, a value for the codeword's "module" or "unit" is first established by dividing the width W of the codeword by the total number of units for each codeword. In a PDF417 symbol, each codeword is seventeen units, so that the width W is divided by seventeen to obtain the unit of the codeword. Thus, for the example in FIG. 12, the unit would be (341/17)=20.0. Each value of the raw t-sequence is then divided by the unit and rounded to an integer to normalize the t-sequence. The normalized t-sequence for the codeword in FIG. 12 is 3, 2, 2, 2, 2, 6, 10.

The normalized t-sequence is then compared to the t-sequences of the start and stop patterns of the code in step 208. If the scanner scans from both left to right and right to left, then the t-sequence must be compared to the start and stop patterns in both their normal and reverse orientations.

If there is a match in step 210, then the index is set in step 214 to a location in the scan line immediately following the pattern if it is a start pattern or immediately preceding it if it is a stop pattern. If the current t-sequence does not match either the start or the stop pattern, however, then in step 212, the index is incremented by one and steps 202 through 210 are repeated until either a match is found or the length of the scan line is exceeded.

Figure 13:
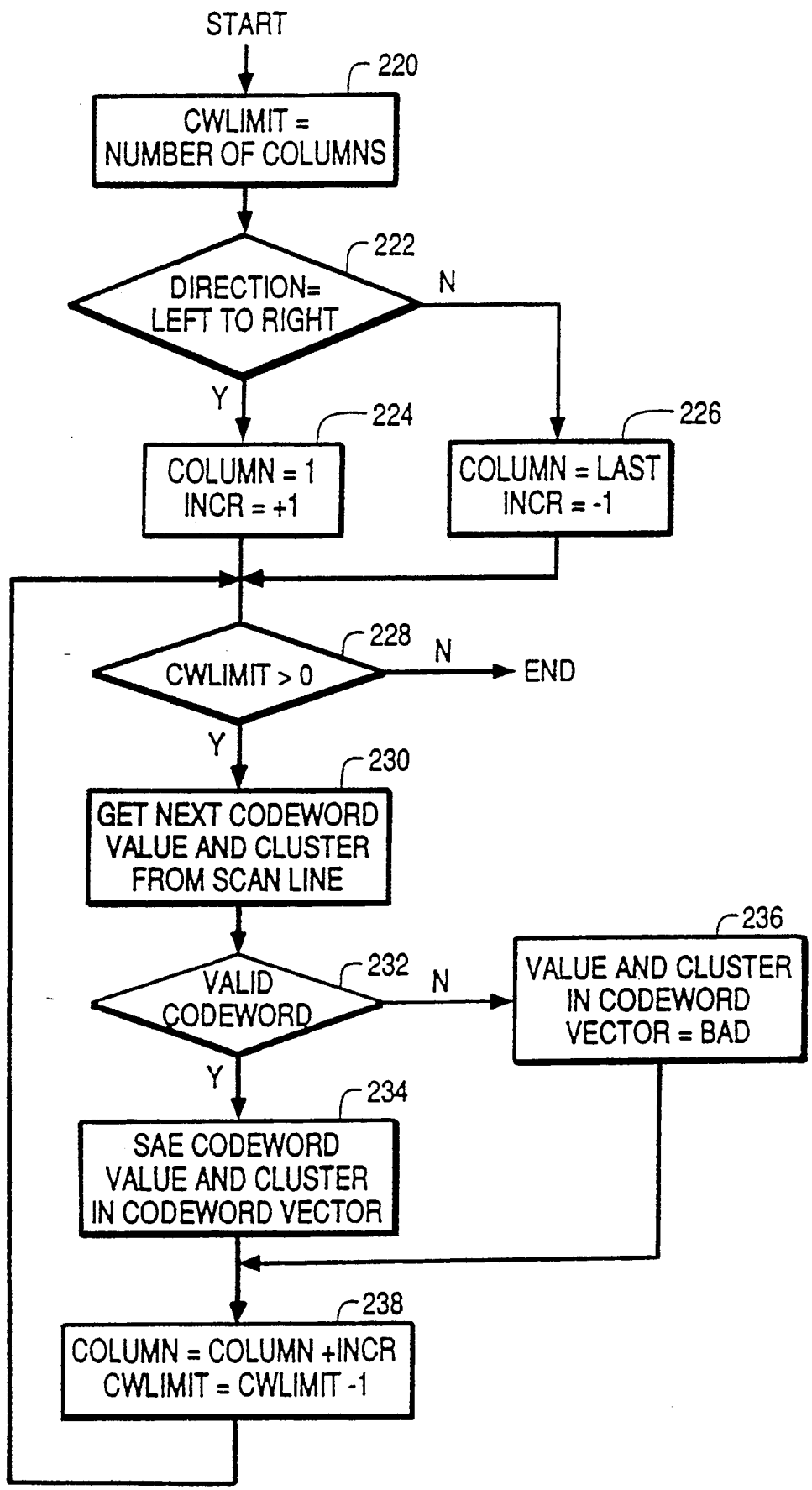
FIG. 13 is a flow diagram of the steps performed by the low-level decoder for decoding a scan line of data into a vector of codeword values and their cluster numbers.

FIG. 13 is a flow chart showing in greater detail the sequence of steps for decoding a scan line of data into a vector of codewords and their clusters as referred to in step 162 of FIG. 9 above. In decoding the individual codeword values and cluster numbers from the scan line, the low-level decoder begins decoding at the start or stop pattern and decodes as many codewords possible. For those codewords that are not successfully decoded, the codeword values in the codeword vector are set to "BAD."

At the completion of the sequence of steps shown in FIG. 13, the codeword vector will contain certain codeword values and cluster numbers in locations corresponding to the appropriate columns of the codewords that were successfully decoded. FIG. 14A shows an example of a codeword vector in which the codewords in eight of the ten columns were successfully decoded. The codeword values in columns 1 and 10 correspond to the left row indicator codeword in row 2 ($L_2$) and the right row indicator codeword in row 1 ($R_1$), respectively. The codewords in columns 5 and 7 were not successfully decoded as indicated by the notation "BAD" in those locations of the codeword vector.

Returning to the first step 220 of FIG. 13, an upper limit on the number of codewords that may be decoded ("cwlimit") is set equal to the number of columns in the codeword matrix. If this number of codewords is successfully decoded, then the decoding process for the current scan line is obviously complete.

Step 222 determines the direction of the scan if the scanner scans from both left to right and right to left. If the particular scan was from left to right as determined in step 222, then the column number of the first codeword is set to "1" in step 224 and the amount that it will incremented by ("incr") each time a subsequent codeword is decoded is set to "+1." If the scan was from right to left, however, then in step 226, the column number of the first codeword in the scan line will be the last column of the codeword matrix, and the incremental value is set to "−1."

Step 228 is the first step of a control loop in which individual codeword values and their cluster numbers are decoded from the scan line of data. In step 228, the codeword limit is tested to see if it is still greater than zero. If not, then all of the codewords in the scan line have been decoded and the loop is exited.

Otherwise, step 230 obtains the next codeword value and its cluster number from the scan line. This step will be discussed in further detail below in connection with FIG. 15.

If the codeword decoded in the previous step is a valid codeword as determined in step 232, then in step 234 the codeword value and its cluster number are saved in the codeword vector at a location corresponding to the column of the codeword. The codeword values thus placed in the codeword vector are ready for incorporation into the codeword matrix.

If the codeword decoded in step 230 is not a valid codeword, however, then the codeword value in the codeword vector corresponding to the current column is set to "BAD" in step 236 to indicate that this codeword was not successfully decoded. A "BAD" codeword is most likely to occur when the scan line crosses the boundary between two rows in the middle of the codeword.

Finally, in step 238, the current column number is either incremented or decremented depending on the direction of the scan, and the codeword limit is decremented by one. Steps 228-236 are then repeated until there has been an attempt to decode all of the codewords in the scan line.

Figure 15:
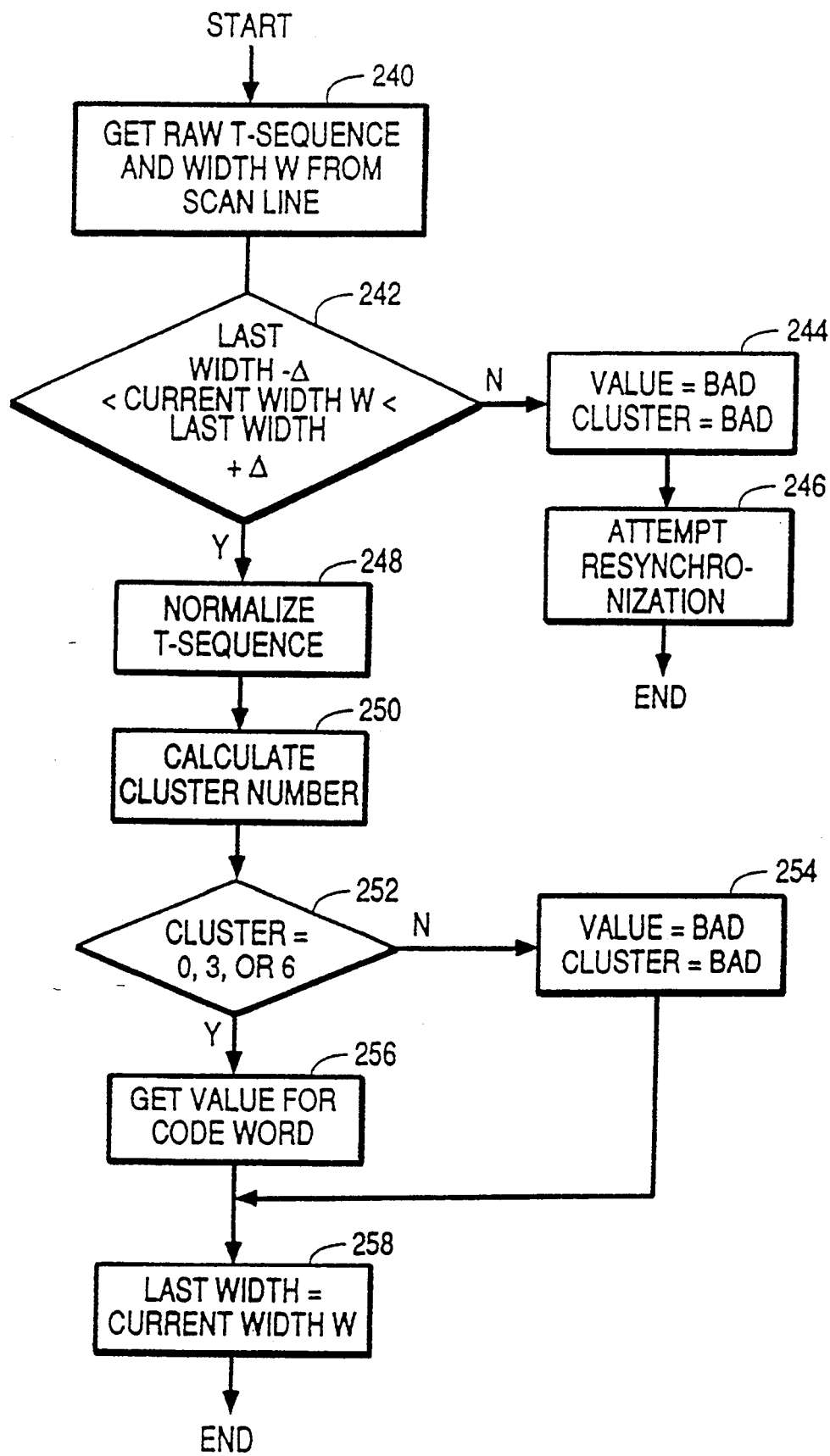
FIG. 15 is a flow diagram of the steps performed by the low-level decoder for decoding an individual codeword value and its cluster number from the scan line data.

FIG. 15 is a flow chart diagram showing the sequence of steps corresponding to step 230 in FIG. 13 and step 172 in FIG. 10 in which an attempt is made to decode an individual codeword value and cluster number from the scan line. In the first step 240, a raw t-sequence and the width W are obtained from the scan line. This same step was discussed previously in connection with step 204 in FIG. 11.

In step 242, the width W of the eight elements presumed to be the next codeword are compared to the width of the previously decoded codeword. If the current width W is not within a range of plus or minus a predetermined difference (delta), then there is probably a split (undercount by a multiple of two elements) or a merge (overcount by a multiple of two elements) error in the current codeword. This codeword is not decoded further, but rather in step 244 its value and cluster number are both set to BAD to indicate that it could not be decoded.

Then in step 246, an attempt is made to resynchronize to the boundary of the next codeword by finding a t-sequence with a corresponding width W that falls within a given tolerance of the expected width of a codeword, based on the width of the previous codeword. If the current width W is significantly greater than the expected width, indicating a possible merge error, then the last two integer values are dropped from the t-sequence until it falls within the proper limits. Likewise, if the current width W is significantly less than the expected width, indicating a possible split error, the next two integer values in the scan line are added to the t-sequence until it falls within the proper limits.

If the current width W is within a certain tolerance of the expected width, as determined in step 242, then an attempt is made to decode the codeword. In step 248, the raw t-sequence is normalized as described above in connection with step 206 in FIG. 11. Then in step 250, the cluster number is determined from the normalized t-sequence. The cluster number may be determined from the t-sequence (as opposed to the X-sequence described above ) as follows:

$$\text{cluster number} = (T_1 - T_2 + T_5 - T_6) \bmod 9$$

For codewords in PDF417, valid cluster numbers are 0, 3, and 6. If in step 252 it is determined that the cluster number is not 0, 3, or 6, then the codeword is not valid. Accordingly, in step 254 the cluster number and value are set to "BAD" to indicate that the codeword was not successfully decoded.

Otherwise, in step 256, the normalized t-sequence and its cluster number are used to find the corresponding codeword value in a look-up table. If no corresponding codeword value is found for the t-sequence, then the codeword value is set to "BAD" to indicate that it was not successfully decoded.

Finally, in step 258 the "last width" value is updated to the current width W of the codeword for use in decoding the next codeword value from the scan line.

Figure 16A:
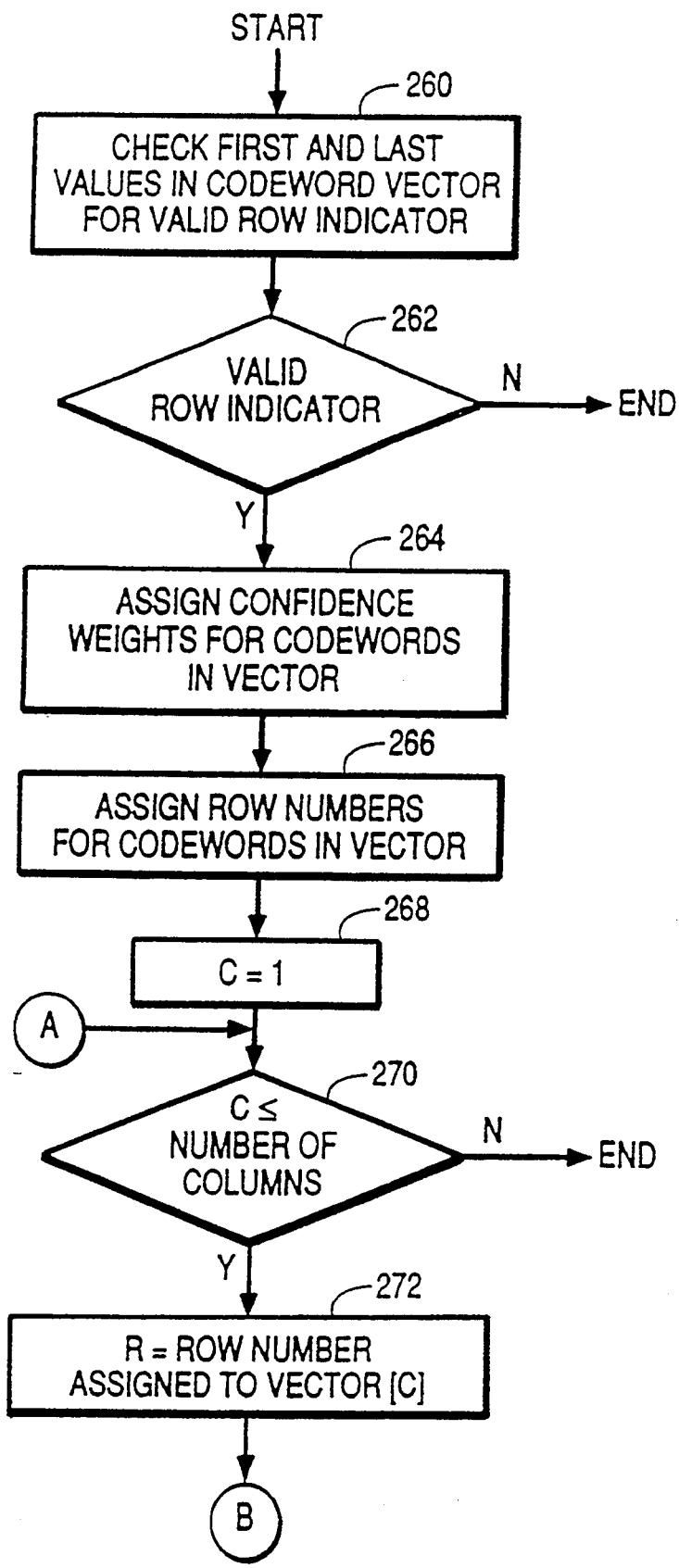
FIGS. 16A and 16B together are a flow diagram of the steps performed by the low-level decoder in order to update the codeword matrix using the codeword vector.
Figure 16B:
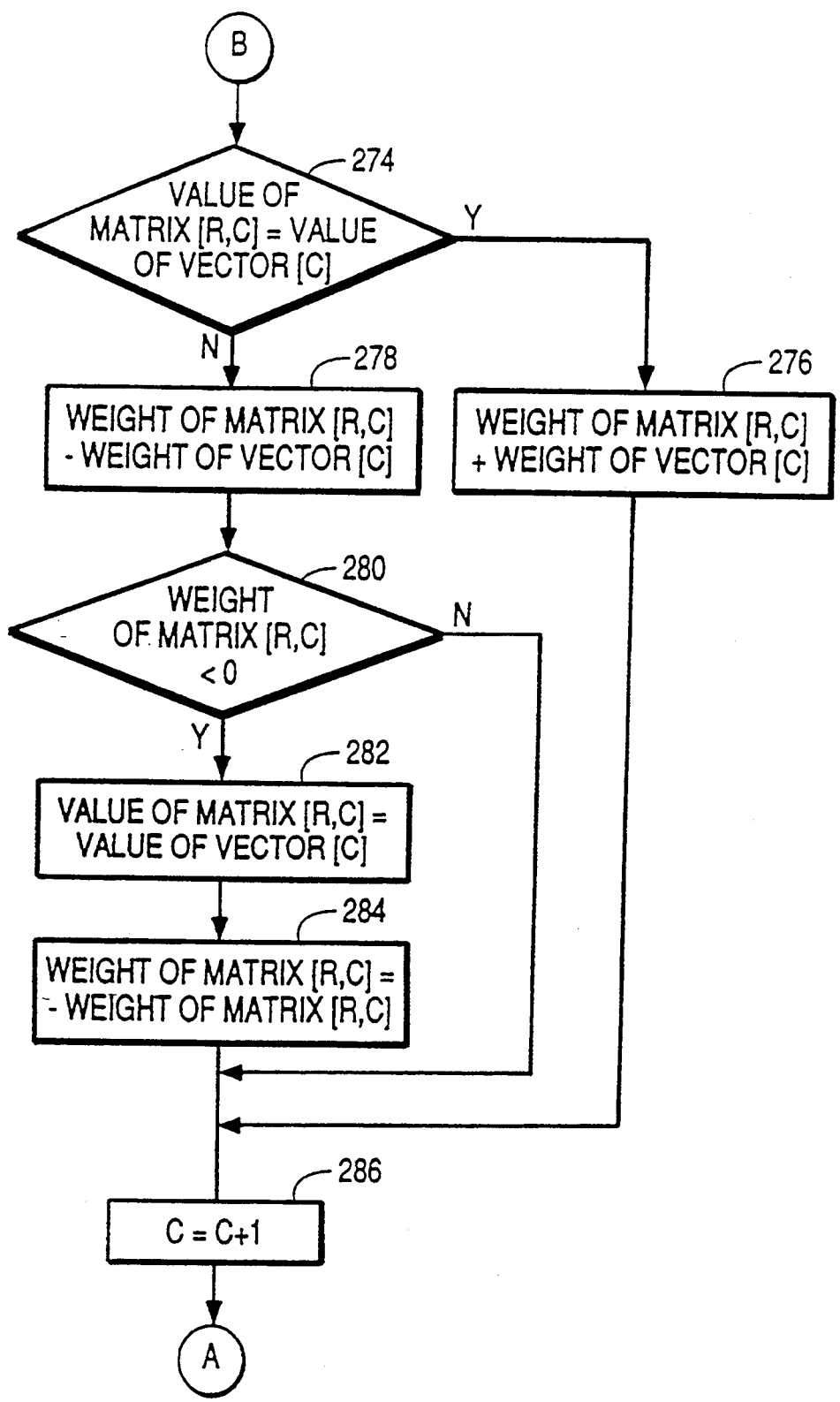

FIGS. 16A and 16B together comprise a flow chart of the sequence of steps executed by the low-level decoder in order to update the codeword matrix using the codeword vector. These figures explain in greater detail step 164 in FIG. 9 discussed above.

The first step 260 of FIG. 16A checks the first and last values in the codeword vector to see if either is a valid row indicator. If neither the first nor the last values in the codeword vector is a valid row indicator, then in step 262 the program exits the routine and no attempt is made to update the codeword matrix using the codeword vector.

If a valid row indicator is present, however, then in step 264 confidence weights are assigned to each codeword value in the codeword vector. Specifically, a confidence weight is assigned to each codeword depending on whether its nearest neighbors and their cluster were also decoded. For example, as shown in FIG. 14B, the codeword values in columns 1, 2, 3, 9, and 10 are assigned high confidence weights ("H") because their immediate neighbors were also successfully decoded and have the same cluster number. The codeword values for columns 4 and 8 are assigned medium confidence weights ("M") because one of their neighbors was successfully decoded and has the same cluster number but the other neighboring codeword value is "BAD." The codeword value in column 3 is assigned a very low confidence weight ("L") because neither of its neighbors was successfully decoded. Thus, the confidence weight for a codeword value at column i in the codeword vector is essentially a function of the cluster numbers of the codewords at columns $i-1$, $i$, and $i+1$. This function may be implemented by a look-up table whose index is calculated from the cluster numbers of the three codewords.

In step 266, a row number is assigned to each codeword value in the codeword vector based on the row indicator codewords and the cluster numbers. As shown in the example in FIG. 14C, the left row indicator codeword $L_2$ indicates that the row number is 2 and the cluster number is 6. The cluster numbers for the codeword values in columns 2-4 are also 6. Therefore, row number 2 is assigned to the codeword values in the first four columns of the codeword vector.

Also in the example in FIG. 14C, columns six and 8-10 all have a cluster number of 3 and the right row indicator codeword $R_1$ indicates that the row number is 1. Therefore, it can be assumed that the scan line crossed the row boundary between row 2 and row 1 and the codeword values in columns 6 and 8-10 should be assigned to row 1.

Once the confidence weights and row numbers have been assigned to each of the codeword values in the codeword vector, the codeword matrix is updated one codeword at a time. In step 268, the column number C of both the codeword vector and the codeword matrix is set is initially set to "1." Step 270 is the first step of an iterative loop which steps through the codewords in the codeword vector and uses them to update the corresponding codewords and their associated confidence weights in the codeword matrix. When the column number C exceeds the number of columns in step 270, then all of the codewords in the codeword vector have been processed and the routine ends.

For each codeword in the codeword vector, step 272 sets the row number R of the codeword matrix to the row number assigned in step 266 to the codeword in the codeword vector at the location C. Thus, for each codeword value in the codeword vector, there is a corresponding value in the codeword matrix at location [R,C].

Continuing in FIG. 16B, step 274 determines whether the current codeword value in location [R,C] in the codeword matrix is the same as the corresponding codeword value in the codeword vector at column C. If the values are the same, then in step 276, the confidence weight assigned to the codeword value in matrix location [R,C] is increased by the confidence weight of the corresponding codeword value in the codeword vector. If not, the confidence weight of the codeword value in the matrix is decreased by the confidence weight of the codeword value in the vector in step 278.

If the confidence weight was decreased in step 278, then in step 280 that confidence weight is tested to see if it was decreased below zero. If the confidence weight is less than zero, then in step 282 the new codeword value in the codeword vector is substituted for the current codeword value in the corresponding location in the codeword matrix. The confidence weight assigned to the codeword value in the matrix is also changed to a positive value in step 284.

Finally, in step 286 the column number C is incremented by 1 for processing the next codeword value in the codeword vector and program control is returned to step 270 for repeating steps 272 through 286 for all of the columns in the vector.

Returning briefly to step 154 in FIG. 9, each time after the codeword matrix has been filled in with the new vector of codeword values and the confidence weights have been updated, an attempt is made to fill in the rest of the matrix using the built-in error correction capability of the symbol. The number and location of codewords which have not yet been successfully decoded may be determined by comparing the confidence weights assigned to each of the codeword values in the matrix with a predetermined threshold. Those values having confidence weights below the threshold are considered to not yet be decoded. If the number of codewords not yet decoded is less than the error correction capability of the symbol as determined by the security level, then an attempt is made to correct the matrix.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A record comprising
   an image portion containing a graphic image; and
   an information portion including data encoded in a machine-readable format including at least two adjacent rows of codewords, each said codeword being represented by at least one pattern of marks.
2. A record comprising
   an image portion containing a graphic image; and
   an information portion overlaying but not obscuring the graphic image, the information portion including data encoded in a machine-readable format including at least two adjacent rows of codewords, each said codeword being represented by at least one pattern of marks, the machine readable format being error-correctable and capable of allowing recovery of the information despite distortion due to the graphic image.
3. The record of claim 1 wherein the codewords include a plurality of information words in the information portion, and
   wherein the image portion includes a plurality of image words each containing a pattern of marks such that the patterns of marks of all of the codewords in the image portion represent the graphic image.
4. The record of claim 3 wherein the data in the information portion is encoded in a two-dimensional bar code.
5. The record of claim 4 wherein the data in the information portion is encoded in PDF417 format.
6. The record of claim 2 wherein the graphic image is a photograph.
7. The record of claim 6 wherein the photograph is an identification photograph of the owner of the record.
8. The record of claim 7 wherein the record is a driver's license.
9. The record of claim 7 wherein the record is a passport.
10. The record of claim 6 wherein the record is a visa.
11. The record of claim 6 wherein the data in the information portion describes portions of the photograph.
12. The record of claim 2 wherein the data in the information portion is encoded in a two-dimensional bar code.
13. A bearer bond comprising
    an image portion containing a graphic image; and
    an information portion including data encoded in an machine-readable format including at least two adjacent rows of codewords, each said codeword being represented by at least one pattern of marks, wherein the codewords include a plurality of information words, and
    wherein the image portion includes a plurality of image words each containing a pattern of marks such that the patterns of marks of all of the codewords in the image portion represent the graphic image.
14. A record comprising
    an image portion containing a graphic image; and
    an information portion including data encoded in a machine-readable format including at least two adjacent rows of codewords, each said codeword being represented by at least one pattern of marks,
    wherein the codewords include a plurality of information words,
    wherein the image portion includes a plurality of image words, each containing a pattern of marks such that the patterns of marks of all of the codewords in the image portion represent the graphic image, and
    wherein the information words and image words are organized as alternating sequences in the at least two adjacent rows.

15. The record of claim 14 wherein each of the rows includes a field indicating the lengths of the alternating sequences of information words and image words.

16. The record of claim 15 wherein each of the rows includes a field identifying the row.

17. A printer system for a record bearing an image, the printer system comprising:
   input means for receiving data to be placed onto the record;
   encoding means, coupled to the input means, for encoding the received data in an error-correctable, machine-readable format; and
   output means, coupled to the encoding means, for printing the encoded data over the image without obscuring the image.

18. The printer system of claim 17 wherein the encoding means includes
   means for encoding the received data in a two-dimensional bar code format.

19. The printer system of claim 18 wherein the means for encoding the received data in a two-dimensional bar code format includes
   means for encoding the received data in PDF417 format.

20. The printer system of claim 17 further including means for placing the image onto the record.

21. The printer system of claim 20 wherein the image is a photograph, and wherein the means for placing the image onto the record includes
   means for placing the photograph onto the record.

22. A printer system for a record containing data in an information portion and a graphic image in an image portion comprising:
   input means for receiving information to be printed in selected areas of the information portion of the record and selected areas of the graphic portion of the record;
   alignment means for locating the selected areas of the information portion and the graphic portion of the record; and
   output means, coupled to the alignment means and the input means, for placing the received information into the selected areas of the information portion and the graphic portion of the record.

23. The printer system of claim 22 wherein the record has rows with alternating sequences of the information words and image words, and each of the rows have a first field containing data identifying that row; and
   wherein the alignment means includes means for reading the first field of the rows to locate the selected areas.

24. The printer system of claim 23 wherein each of the rows also includes a second field including the lengths of alternating sequences of information words and image words in the corresponding row, and
   wherein the aligned means includes means for reading the second field of a selected row to locate the selected areas.

25. A reader system for a record having an information portion containing data encoded in an error-correctable format and a graphic image, the reader system comprising:
   reading means for extracting the data from the information portion;
   correction means, coupled to the reading means, for performing error correction on the data to correct any errors in the extracted data; and
   output means, coupled to the correction means, for outputting the extracted data after error correction.

26. The reader system of claim 25 wherein the reading means includes
   scanning means for locating the information area, and
   decoding means, coupled to the scanning means, for decoding the encoded information from the information area.

27. A reader system for a record containing data in an information portion and a graphic image in an image portion, the information portion containing a plurality of information words and the image portion containing a plurality of image words, the information words and data words being organized into alternating sequences in rows, each row containing a field indicating the lengths of the alternating sequences, the reader system comprising:
   means for reading the field to determine the lengths of the alternating sequences of information words and image words;
   means for reading only the information words in the row; and
   means for decoding the information words read.

28. A stock certificate comprising
   an image portion containing a graphic image; ad
   an information portion including data encoded in an machine-readable format including at least two adjacent rows of codewords, each said codeword being represented by at least one pattern of marks, wherein the codewords include a plurality of information words, and
   wherein the image portion includes a plurality of image words each containing a pattern of marks such that the patterns of marks of all of the codewords in the image portion represent the graphic image.

* * * * *

(12) REEXAMINATION CERTIFICATE (4349th)

United States Patent
Wang et al.

(10) Number: US 5,337,361 C1
(45) Certificate Issued: May 15, 2001

(54) RECORD WITH ENCODED DATA

(75) Inventors: Ynjiun P. Wang, Stony Brook; Jerome Swartz, Old Field; Daniel R. McGlynn, Brooklyn, all of NY (US)

(73) Assignee: Symbol Technologies, Inc., Bohemia, NY (US)

Reexamination Request:
No. 90/005,099, Sep. 10, 1998

Reexamination Certificate for:
Patent No.: 5,337,361
Issued: Aug. 9, 1994
Appl. No.: 07/891,742
Filed: Jun. 1, 1992

(*) Notice: This patent is subject to a terminal disclaimer.

Related U.S. Application Data

(63) Continuation-in-part of application No. 07/653,822, filed on Feb. 11, 1991, now Pat. No. 5,113,445, which is a continuation of application No. 07/550,023, filed on Jul. 9, 1990, now abandoned, which is a continuation-in-part of application No. 07/461,881, filed on Jan. 5, 1990, which is a continuation-in-part of application No. 07/851,493, filed on Mar. 16, 1992.

(51) Int. Cl.[7] ........................................................ H04L 9/00
(52) U.S. Cl. ...................... 380/51; 235/462.11; 380/55; 380/59; 713/179
(58) Field of Search .................................. 380/3, 23, 51, 380/55, 59, 54; 235/462, 487, 488, 489, 490, 491, 492, 493, 494, 495, 462.01–462.49; 283/57, 58, 59, 72, 73, 74, 75, 76, 77, 94, 106, 107, 108, 109, 110, 111, 112, 113, 17; 713/168, 176–179

(56) References Cited

U.S. PATENT DOCUMENTS 15,486 * 8/1856 Hannay ................................. 283/72

OTHER PUBLICATIONS

"Webster's Ninth New Collegiate Dictionary," Merriam–Webster Publishers; Springfield, Mass.; 1983; pp. 255, 533, 815, and 933.*
"Something has happened to paper that you can't ignore," Softstrip International marketing brochure, 1986.
Apprentice Yesterday, Master Today: Softstrip Is Users' Super–Hero, *IDSystems*, vol. 8, No. 6, pp. 31–34, Jul. 1988.
"Introducing SOFTCARD," Automatic I. D. News Action Card Deck, Jul., 1989.
"Introducing SOFTCARD" advertisement, *Automatic I. D. News*, p. 102, Oct. 1989.
"Technologia Softstrip" Italian marketing material, Oct. 1990.
"Uses of Softstrips," Key Strip marketing material, 1990.
"SOFTSTRIP," Soft–Data Italian marketing brochure, 1990.
"Softstrip: Data Card Reader System," Key Strip marketing material, 1991.

* cited by examiner

*Primary Examiner*—Bernarr E. Gregory

(57) ABSTRACT

A record contains a graphic image and an information area which are interrelated to discourage misuse of the record. The information area can overlay the graphic image and include information encoded in a error-correctable, machine-readable format which allows recovery of the information despite distortion due to the underlying graphic image. The record may also represent the image by words similar in form to words in the information area. Both the information and graphic words can then be altered when an action regarding the record takes place.

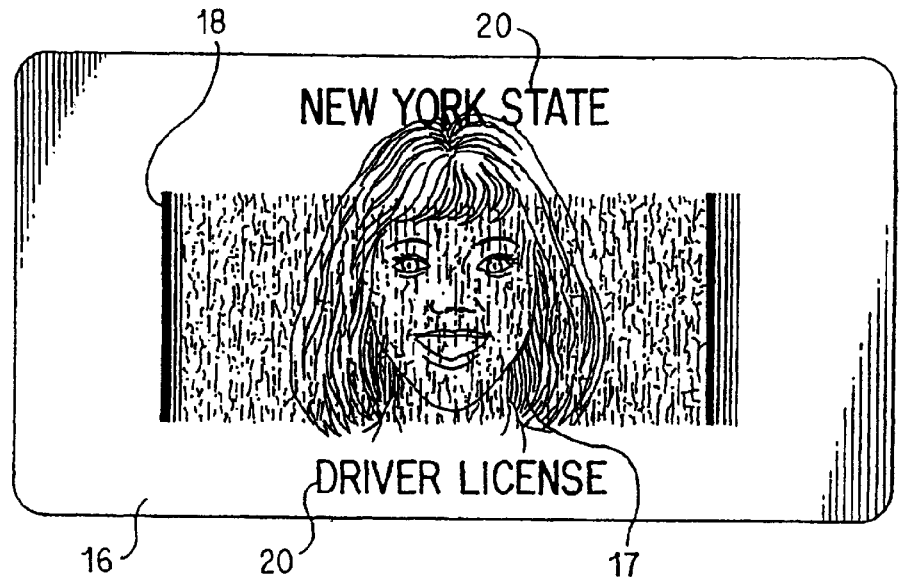

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2 and 6–27 is confirmed.

Claims 1, 3 and 28 are determined to be patentable as amended.

Claims 4 and 5, dependent on an amended claim are determined to be patentable.

1. A record comprising an image portion containing a graphic image; and an information portion *overlaying but not obscuring the graphic image, the information portion* including data encoded in a machine-readable format including at least two adjacent rows of codewords, each said codeword being represented by at least one pattern of marks.

3. [The] *A* record [of claim 1] *comprising*

*an image portion containing a graphic image; and*

*an information portion including data encoded in a machine-readable format including at least two adjacent rows of codewords, each said codeword being represented by at least one pattern of marks,* wherein the codewords include a plurality of information words in the information portion, and wherein the image portion includes a plurality of image words each containing a pattern of marks such that the patterns of marks of all of the codewords in the image portion represent the graphic image.

28. A stock certificate comprising an image portion containing a graphic image; [ad] *and* an information portion including data encoded in an machine-readable format including at least two adjacent rows of codewords, each said codeword being represented by at least one pattern of marks, wherein the codewords include a plurality of information words, and wherein the image portion includes a plurality of image words each containing a pattern of marks such that the patterns of marks of all of the codewords in the image portion represent the graphic image.

* * * * *